(12) United States Patent
Ye et al.

(10) Patent No.: US 12,143,948 B2
(45) Date of Patent: Nov. 12, 2024

(54) METHOD AND APPARATUS FOR INDICATION AND TRANSMISSION OF DOWNLINK SIGNAL/CHANNEL FOR INITIAL ACCESS

(71) Applicant: Samsung Electronics Co., Ltd., Suwon-si (KR)

(72) Inventors: Qiaoyang Ye, San Jose, CA (US); Jeongho Jeon, San Jose, CA (US); Shuang Tian, Cupertino, CA (US); Joonyoung Cho, Portland, OR (US)

(73) Assignee: Samsung Electronics Co., Ltd., Suwon-si (KR)

( * ) Notice: Subject to any disclaimer, the term of this patent is extended or adjusted under 35 U.S.C. 154(b) by 524 days.

(21) Appl. No.: 17/125,851

(22) Filed: Dec. 17, 2020

(65) Prior Publication Data

US 2021/0337494 A1    Oct. 28, 2021

Related U.S. Application Data

(60) Provisional application No. 63/050,528, filed on Jul. 10, 2020, provisional application No. 63/050,551, (Continued)

(51) Int. Cl.
*H04W 56/00* (2009.01)
*H04L 5/00* (2006.01)

(52) U.S. Cl.
CPC ....... *H04W 56/0005* (2013.01); *H04L 5/0048* (2013.01)

(58) Field of Classification Search
CPC .............. H04L 5/0051; H04L 5/0048; H04L 27/26136; H04L 27/2607; H04W 68/005; (Continued)

(56) References Cited

U.S. PATENT DOCUMENTS

| 11,343,784 B2 * | 5/2022 | Wei ................... H04W 76/11 |
| 2015/0016339 A1 | 1/2015 | You et al. |

(Continued)

FOREIGN PATENT DOCUMENTS

| CA | 3071735 A1 * | 8/2020 | ........... H04B 7/0695 |
| CN | 109923844 A | 6/2019 | |

(Continued)

OTHER PUBLICATIONS

Ian F. Akyildiz, et al., "Terahertz band: Next frontier for wireless communications," Physical Communication, vol. 12, pp. 16-32, Sep. 2014.

(Continued)

*Primary Examiner* — Ayaz R Sheikh
*Assistant Examiner* — Louis Samara

(57) ABSTRACT

A synchronization signal block (SSB) including a primary synchronization signal (PSS), a secondary synchronization signal (SSS), a physical broadcast channel (PBCH) is transmitted using first and second beams. One or more symbols adjoining the first and second synchronization signals are configured to accommodate a beam switching time. At least one signal indicates a beam index for the first beam transmitting the first synchronization signal, and the beam index for the second beam transmitting the second synchronization signal is either signaled or determined based on a predetermined relationship between a resource for the first synchronization signal and a resource for the second synchronization signal. The beam indices may comprise first and second numbers of bits and/or may be jointly encoded. The beam indices may be indicated by one of the PSS, the SSS, the PBCH, a demodulation reference signal (DMRS), or a synchronization or reference signal designated for that purpose.

20 Claims, 19 Drawing Sheets

Related U.S. Application Data filed on Jul. 10, 2020, provisional application No. 63/016,619, filed on Apr. 28, 2020, provisional application No. 63/016,597, filed on Apr. 28, 2020.

(58) Field of Classification Search
CPC ... H04W 56/001; H04W 76/11; H04W 16/28; H04B 7/0695; H04B 7/088; H04B 7/04; H04B 7/0617; H04B 7/086
See application file for complete search history.

(56) References Cited

U.S. PATENT DOCUMENTS

| | | | |
|---|---|---|---|
| 2017/0201976 A1* | 7/2017 | Yue | H04B 7/0617 |
| 2017/0303264 A1* | 10/2017 | Islam | H04B 7/0621 |
| 2018/0084593 A1 | 3/2018 | Chen et al. | |
| 2018/0139712 A1 | 5/2018 | Abedini et al. | |
| 2018/0139752 A1* | 5/2018 | Wang | H04B 7/2643 |
| 2018/0176065 A1 | 6/2018 | Deng et al. | |
| 2018/0198659 A1 | 7/2018 | Ko et al. | |
| 2018/0343155 A1 | 11/2018 | Zeng et al. | |
| 2019/0349960 A1* | 11/2019 | Li | H04L 5/0055 |
| 2020/0351673 A1* | 11/2020 | Bai | H04W 76/11 |
| 2020/0396744 A1* | 12/2020 | Xiong | H04B 7/088 |
| 2021/0037428 A1* | 2/2021 | Du | H04B 7/086 |
| 2021/0058206 A1* | 2/2021 | Ye | H04L 5/0048 |
| 2021/0076324 A1* | 3/2021 | Kaikkonen | H04B 7/0617 |
| 2021/0105605 A1* | 4/2021 | Tsuboi | H04W 8/08 |
| 2021/0175959 A1* | 6/2021 | Tang | H04B 7/0695 |
| 2021/0266056 A1* | 8/2021 | Hashemi | H04B 7/0695 |
| 2022/0201672 A1* | 6/2022 | Tomeba | H04B 7/0456 |
| 2022/0264489 A1* | 8/2022 | Sakhnini | H04L 5/0053 |
| 2022/0295303 A1* | 9/2022 | Takada | H04B 7/088 |

FOREIGN PATENT DOCUMENTS

| | | | | |
|---|---|---|---|---|
| CN | 109937561 A | | 6/2019 | |
| CN | 110419185 A | * | 11/2019 | H04B 7/2656 |
| JP | 2019500815 A | * | 1/2019 | |
| VN | 10038989 B | * | 2/2024 | H04B 7/0695 |
| WO | 2017/180335 A1 | | 10/2017 | |
| WO | WO-2018082768 A1 | * | 5/2018 | H04B 7/04 |
| WO | WO-2021062761 A1 | * | 4/2021 | H04B 7/0404 |

OTHER PUBLICATIONS

Josep M. Jornet, et al., "Channel Modeling and Capacity Analysis for Electromagnetic Wireless Nanonetworks in the Terahertz Band," IEEE Trans. Wireless Communications, vol. 10, No. 10, pp. 3211-3221, Oct. 2011.
"3rd Generation Partnership Project; Technical Specification Group Radio Access Network; NR; Requirements for support of radio resource management (Release 16)", 3GPP TS 38.133 V16.3.0, Mar. 2020, 1169 pages.
ZTE, "Considerations on DL reference signals and channels design for NR-U", 3GPP TSG RAN WG1 Meeting #95, Nov. 12-16, 2018, R1-1812433, 8 pages.
Ericsson et al., "Limitation of cell-level load reporting in load balancing", 3GPP TSG-RAN WG3 #105, Aug. 26-30, 2019, R3-194286, 4 pages.
Nokia et al., "Initial Access Signals and Channels for NR-U", 3GPP TSG RAN WG1 Meeting #96, Feb. 25-Mar. 1, 2019, R1-1902435, 29 pages.
Notification of Transmittal of the International Search Report and the Written Opinion of the International Searching Authority, or the Declaration dated Aug. 4, 2021 in connection with International Patent Application No. PCT/KR2021/005396, 11 pages.
Extended European Search Report issued Jul. 7, 2023 regarding Application No. 201796991.4, 7 pages.
Chinese National Intellectual Property Administration, First Office Action issued Jun. 27, 2024 regarding Application No. 202180031939. 2, 15 pages.

* cited by examiner

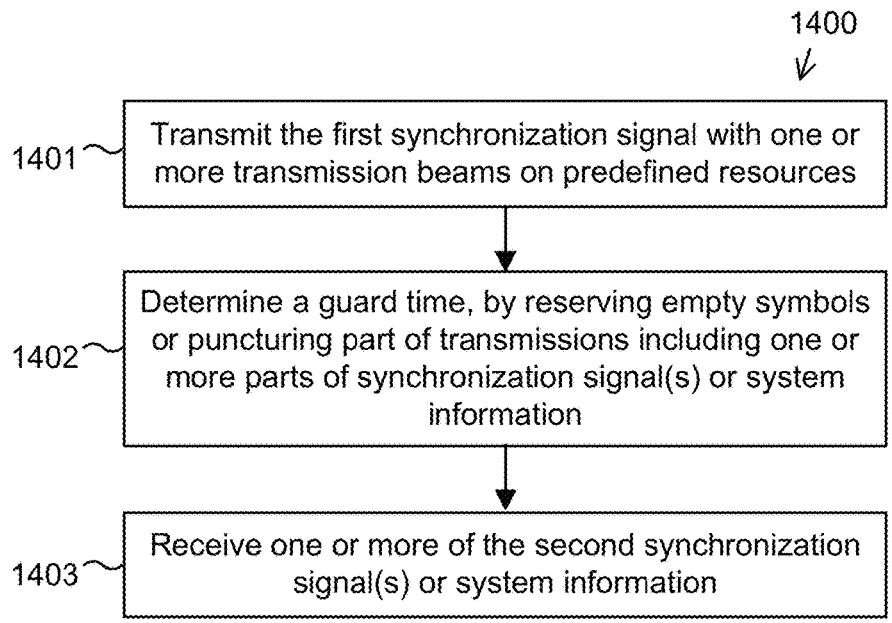
FIG. 14
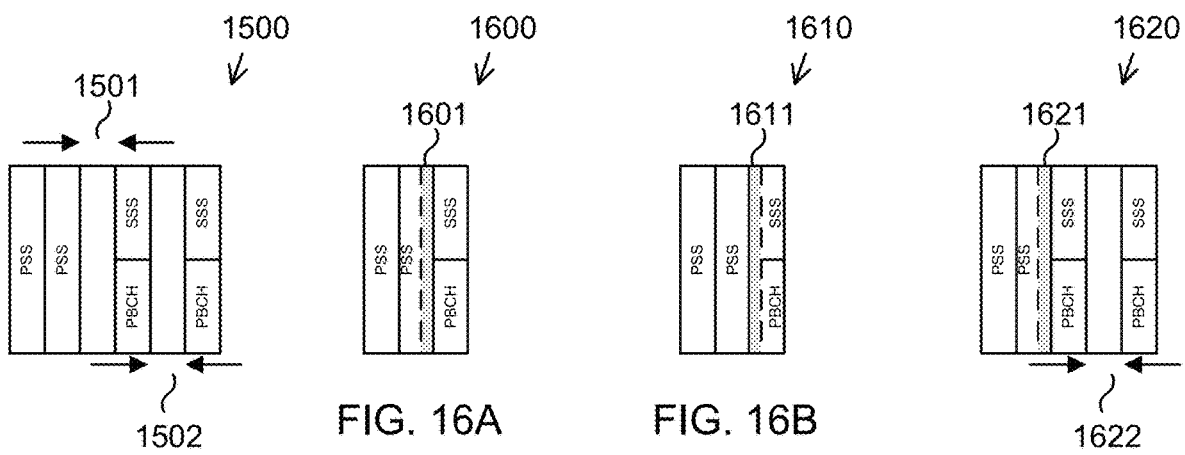
FIG. 15
FIG. 16A
FIG. 16B
FIG. 16C

METHOD AND APPARATUS FOR INDICATION AND TRANSMISSION OF DOWNLINK SIGNAL/CHANNEL FOR INITIAL ACCESS

CROSS-REFERENCE TO RELATED APPLICATION AND CLAIM OF PRIORITY

This application claims priority under 35 U.S.C. § 119(e) to U.S. Provisional Patent Application No. 63/016,597 filed Apr. 28, 2020, U.S. Provisional Patent Application No. 63/016,619 filed Apr. 28, 2020, U.S. Provisional Patent Application No. 63/050,528 filed Jul. 10, 2020, and U.S. Provisional Patent Application No. 63/050,551 filed Jul. 10, 2020. The above-identified patent documents are incorporated herein by reference.

TECHNICAL FIELD

The present disclosure relates generally to downlink (DL) signal/channel design for initial access for high frequency band communications, and more specifically, to beam index indication and guard time for beam switching for DL signal/channel for initial access and DL signal/channel design for initial access that enables efficient beam acquisition and provides good coverage and detection performance.

BACKGROUND

To meet the demand for wireless data traffic having increased since deployment of $4^{th}$ Generation (4G) or Long Term Evolution (LTE) communication systems and to enable various vertical applications, efforts have been made to develop and deploy an improved $5^{th}$ Generation (5G) and/or New Radio (NR) or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 giga-Hertz (GHz) or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and technologies associated therewith is for reference as certain embodiments of the present disclosure may be implemented in 5G systems, $6^{th}$ Generation (6G) systems, or even later releases which may use terahertz (THz) bands. However, the present disclosure is not limited to any particular class of systems or the frequency bands associated therewith, and embodiments of the present disclosure may be utilized in connection with any frequency band. For example, aspects of the present disclosure may also be applied to deployment of 5G communication systems, 6G communications systems, or communications using THz bands.

SUMMARY

Embodiments within this disclosure relate to electronic devices and methods on DL signal/channel design for initial access for high frequency band (e.g. THz band) communication, more particularly, to electronic devices and methods on DL signal/channel design for initial access that enable efficient beam acquisition and provide good coverage and detection performance.

A set of synchronization signals including first and second synchronization signals is generated. The first synchronization signal is transmitted using a first beam, and the second synchronization signal is transmitted using a second beam. At least one signal indicates a beam index for the first beam transmitting the first synchronization signal, and one or more symbols adjoining the first and second synchronization signals are configured to accommodate a beam switching time for switching between the first beam and the second beam. The set of synchronization signals comprises a synchronization signal block (SSB), the first synchronization signal is a primary synchronization signal (PSS) and the second synchronization signal is a secondary synchronization signal (SSS), and the synchronization signal block includes a physical broadcast channel (PBCH). Either the at least one signal indicates a beam index for the second beam transmitting the second synchronization signal, or the beam index for the second synchronization signal is determined based on a predetermined relationship between a resource for transmission of the first synchronization signal and a resource for the second synchronization signal. The beam index for the first synchronization signal comprises a first number of bits and a beam index for the second synchronization signal comprises a second number of bits, and/or the beam index for the first synchronization signal and a beam index for the second synchronization signal are jointly encoded. The at least one signal or channel indicating the beam index for the first synchronization signal, where the signal or channel can be one of the PSS, the SSS, the PBCH, a demodulation reference signal (DMRS), or a synchronization or reference signal designated for indicating the beam index for the first synchronization signal. The one or more symbols adjoining the synchronization signals or channels that use different transmission beams are reserved to accommodate the beam switching time, punctured to accommodate the beam switching time, or reserved for a first region and punctured for a second region. The PSS, the SSS, and the PBCH may be multiplexed in one of a time domain and a frequency domain, with different numbers of repetitions applied to one or more of the PSS, the SSS, and the PBCH. Multiple transmissions of the SSS or the PBCH, each containing different information, may be associated with one PSS, and quasi co-location (QCL) is not assumed for the transmission of the PSS and transmissions of the SSS or the PBCH. The first beam is one of a first plurality of beams within a sector of a coverage area and the second beam is one of a second plurality of beams within the sector, and wherein the first beam covers more of the sector than the second beam.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 14 illustrates a flowchart for an example of transmission beam switching during guard time according to embodiments of the present disclosure;

FIG. 15 illustrates an example of a guard time according to embodiments of the present disclosure;

FIGS. 16A, 16B and 16C illustrate examples of a guard time according to embodiments of the present disclosure;

FIGS. 21A-21I illustrate are diagrams illustrating some examples of the multiplexing methods for PSS, SSS and PBCH with repetition for the process illustrated by FIG. 6;

DETAILED DESCRIPTION

Figure 1:
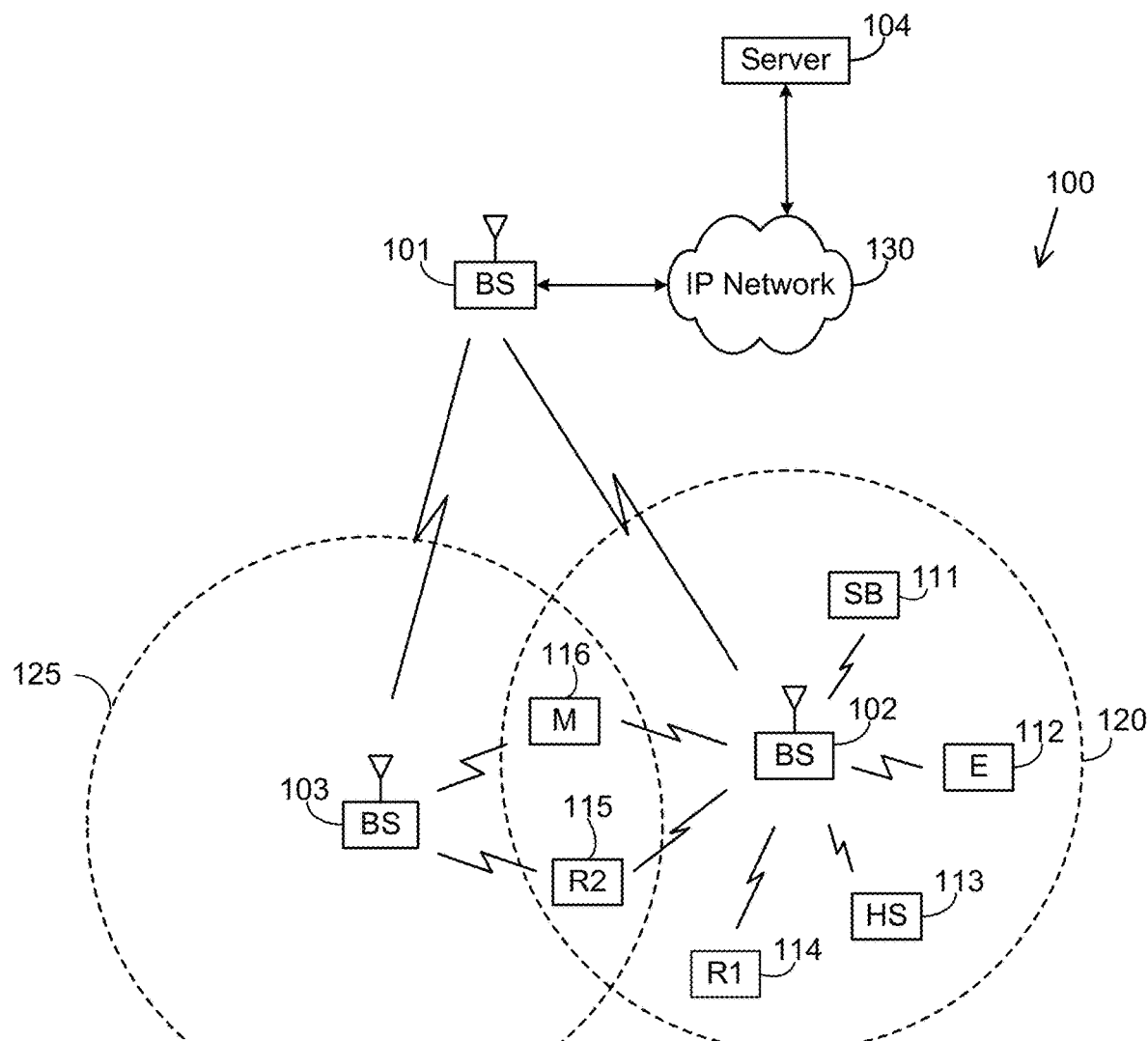
FIG. 1 illustrates an exemplary networked system according to various embodiments of this disclosure.

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

REFERENCES

[Akyildiz14] I. F. Akyildiz, J. M. Jornet, and C. Han, "Terahertz band: Next frontier for wireless communications," Physical Communication, vol. 12, pp. 16-32, September 2014

[Jornet11] J. M. Jornet and I. F. Akyildiz, "Channel modeling and capacity analysis for electromagnetic wireless nanonetworks in the terahertz band," IEEE Trans. Wireless Commun., vol. 10, no. 10, pp. 3211-3221, October 2011.

[Dahlman18] Erik Dahlman, Stefan Parkvall, and Johan Skold, "5G NR: The next generation wireless access technology," Academic Press, 2018.

[38.133] ETSI, TS 138.133, Requirements for support of radio resource management. The above-identified references are incorporated herein by reference.

Abbreviations

THz TeraHertz
CFO carrier frequency offset
BS Base Station
NR New Radio
3GPP 3rd Generation Partnership Project
PSS Primary Synchronization Signal
SSS Secondary Synchronization Signal
PBCH Physical Broadcast Channel
SSB Synchronization Signal Block
TDM Time Division Multiplexing
PA Power Amplifier
PAPR Peak to Average Power Ratio
FR Frequency Range
SFN System Frame Number
High Frequency Band, e.g., TeraHertz (THz) Band Communication To meet the exponentially increased wireless traffic accompanied with the urgent need of high data rate, wireless communication in high frequency band is envisioned to be one of the most promising approaches. One of the high frequency bands is THz band, which generally refers to band with range of 0.1 THz-10 THz [Akyildiz14]. The very wide available bandwidth in high frequency band offers new, exciting opportunities for enabling extremely high throughput, e.g. in unit of Tera bits per second (Tbps).

Compared to conventional cellular systems, communication over a high frequency band (e.g. THz band) suffers excessive path loss. Additionally, such communication experiences significant atmospheric absorption and high rain attenuation, which are both exponential to the distance [Jornet11]. Considering the possibility to make a large number of antenna elements compact due to smaller wavelength of the high frequency band communication band, highly directional beamforming becomes one of the key enablers for high frequency band communication to compensate the high path and penetration losses. However, with highly directional beamforming, the number of beams would increase considerably, which poses new challenges in the beam acquisition mechanism.

Besides the impact on the number of beams, the carrier frequency offset (CFO) is much larger than conventional cellular systems, due to high carrier frequency. In this disclosure, the orthogonal frequency division multiplexing (OFDM) waveform is considered as the baseline for high frequency communication system. To make the high frequency band communication more robust with respect to the large CFO, larger subcarrier spacing can be preferred. Moreover, power amplifier (PA) efficiency issues become more critical in high frequency band system, and waveform with low PAPR can be preferred. For OFDM systems, a large number of subcarriers generally results in high PAPR. This motivates a small number of subcarriers in the high frequency band communication system design, which would also result in preference of large subcarrier spacing. The shortened symbol duration due to large subcarrier spacing necessitates the design for high frequency band communication to compensate the coverage and detection performance loss.

FIG. 1 illustrates an exemplary networked system according to various embodiments of this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station (BS) 101, a BS 102, and a BS 103. The BS 101 communicates with the BS 102 and the BS 103. The BS 101 also communicates with at least one Internet protocol (IP) network 130, such as the Internet, a proprietary IP network, or another data network.

The BS 102 provides wireless broadband access to the network 130 for a first plurality of user equipments (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R1); a UE 115, which may be located in a second residence (R2); and a UE 116, which may be a mobile device (M) like a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G, LTE, LTE Advanced (LTE-A), WiMAX, WiFi, or other wireless communication techniques.

Depending on the network type, other well-known terms may be used instead of "base station" or "BS," such as node B, evolved node B ("eNodeB" or "eNB"), a 5G node B ("gNodeB" or "gNB") or "access point." For the sake of convenience, the terms "base station" and/or "BS" are used in this disclosure to refer to network infrastructure components that provide wireless access to remote terminals. Also, depending on the network type, other well-known terms may be used instead of "user equipment" or "UE," such as "mobile station" (or "MS"), "subscriber station" (or "SS"), "remote terminal," "wireless terminal," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extent of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

Although FIG. 1 illustrates one example of a wireless network 100, various changes may be made to FIG. 1. For example, the wireless network 100 could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BS 101, 102, and/or 103 could provide access to other or additional external networks, such as external telephone networks or other types of data networks.

Figure 2:
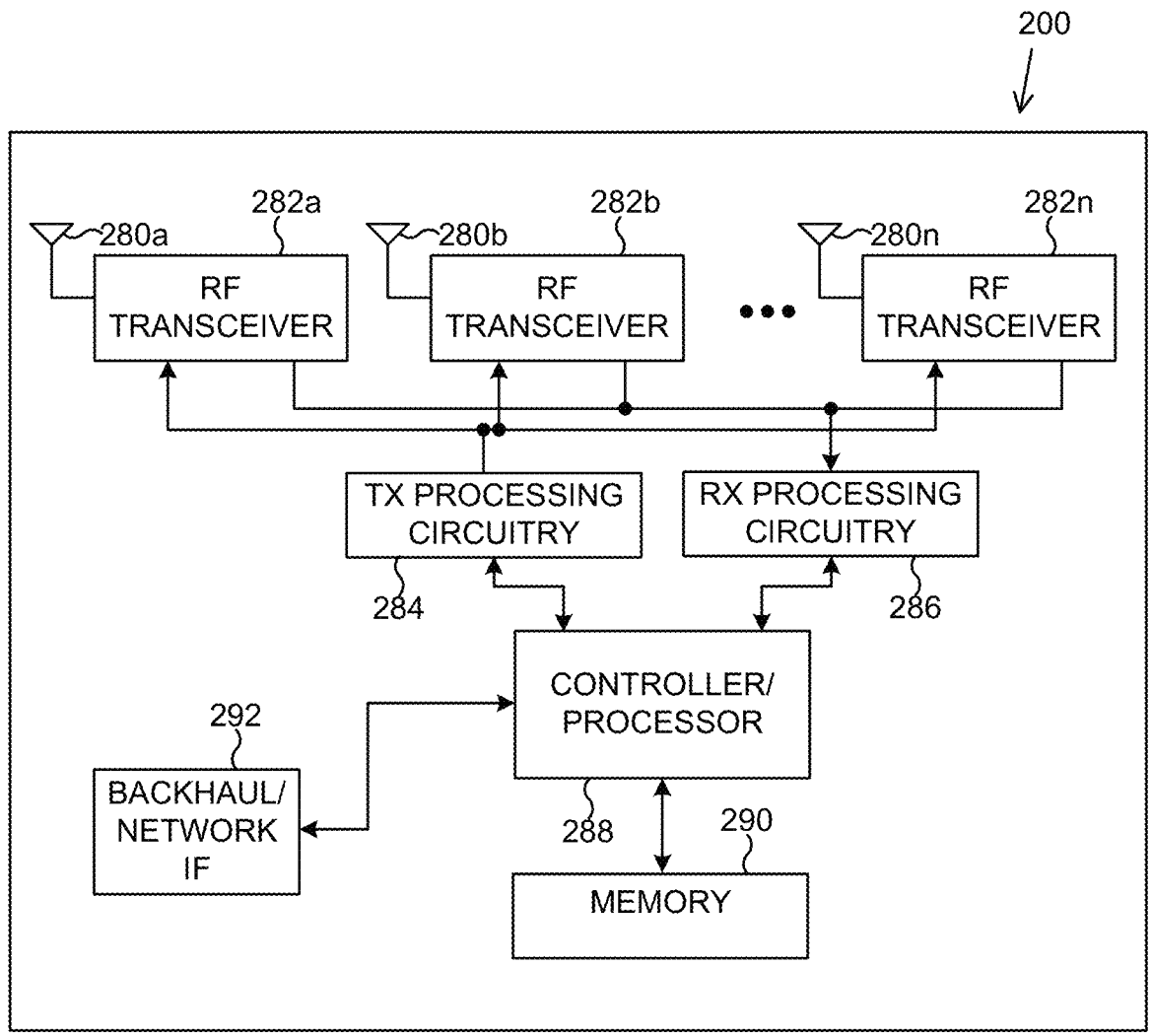
FIG. 2 illustrates an exemplary base station (BS) according to various embodiments of this disclosure.

FIG. 2 illustrates an exemplary base station (BS) according to various embodiments of this disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 280a-280n, multiple radio frequency (RF) transceivers 282a-282n, transmit (TX or Tx) processing circuitry 284, and receive (RX or Rx) processing circuitry 286. The BS 102 also includes a controller/processor 288, a memory 290, and a backhaul or network interface 292.

The RF transceivers 282a-282n receive, from the antennas 280a-280n, incoming RF signals, such as signals transmitted by UEs in the network 100. The RF transceivers 282a-282n down-convert the incoming RF signals to generate IF or baseband signals. The IF or baseband signals are sent to the RX processing circuitry 286, which generates processed baseband signals by filtering, decoding, and/or digitizing the baseband or IF signals. The RX processing circuitry 286 transmits the processed baseband signals to the controller/processor 288 for further processing.

The TX processing circuitry 284 receives analog or digital data (such as voice data, web data, e-mail, or interactive video game data) from the controller/processor 288. The TX processing circuitry 284 encodes, multiplexes, and/or digitizes the outgoing baseband data to generate processed baseband or IF signals. The RF transceivers 282a-282n receive the outgoing processed baseband or IF signals from the TX processing circuitry 284 and up-converts the baseband or IF signals to RF signals that are transmitted via the antennas 280a-280n.

The controller/processor 288 can include one or more processors or other processing devices that control the overall operation of the BS 102. For example, the controller/processor 288 could control the reception of forward channel signals and the transmission of reverse channel signals by the RF transceivers 282a-282n, the RX processing circuitry 286, and the TX processing circuitry 284 in accordance with well-known principles. The controller/processor 288 could support additional functions as well, such as more advanced wireless communication functions and/or processes described in further detail below. For instance, the controller/processor 288 could support beam forming or directional routing operations in which outgoing signals from multiple antennas 280a-280n are weighted differently to effectively steer the outgoing signals in a desired direction. Any of a wide variety of other functions could be supported in the BS 102 by the controller/processor 288. In some embodiments, the controller/processor 288 includes at least one microprocessor or microcontroller.

The controller/processor 288 is also capable of executing programs and other processes resident in the memory 290, such as a basic operating system (OS). The controller/processor 288 can move data into or out of the memory 290 as required by an executing process.

The controller/processor 288 is also coupled to the backhaul or network interface 292. The backhaul or network interface 292 allows the BS 102 to communicate with other devices or systems over a backhaul connection or over a network. The interface 292 could support communications over any suitable wired or wireless connection(s). For example, when the BS 102 is implemented as part of a cellular communication system (such as one supporting 6G, 5G, LTE, or LTE-A), the interface 292 could allow the BS 102 to communicate with other BSs over a wired or wireless backhaul connection. When the BS 102 is implemented as an access point, the interface 292 could allow the BS 102 to communicate over a wired or wireless local area network or over a wired or wireless connection to a larger network (such as the Internet). The interface 292 includes any suitable structure supporting communications over a wired or wireless connection, such as an Ethernet or RF transceiver.

The memory 290 is coupled to the controller/processor 288. Part of the memory 290 could include a RAM, and another part of the memory 290 could include a Flash memory or other ROM.

As described in more detail below, base stations in a networked computing system can be assigned as synchronization source BS or a slave BS based on interference relationships with other neighboring BSs. In some embodiments, the assignment can be provided by a shared spectrum manager. In other embodiments, the assignment can be agreed upon by the BSs in the networked computing system. Synchronization source BSs transmit OSS to slave BSs for establishing transmission timing of the slave BSs.

Although FIG. 2 illustrates one example of BS 102, various changes may be made to FIG. 2. For example, the BS 102 could include any number of each component shown in FIG. 2. As a particular example, an access point could include a number of interfaces 292, and the controller/processor 288 could support routing functions to route data between different network addresses. As another particular example, while shown as including a single instance of TX processing circuitry 284 and a single instance of RX processing circuitry 286, the gNB 102 could include multiple instances of each (such as one per RF transceiver). Also, various components in FIG. 2 could be combined, further subdivided, or omitted and additional components could be added according to particular needs.

Figure 3:
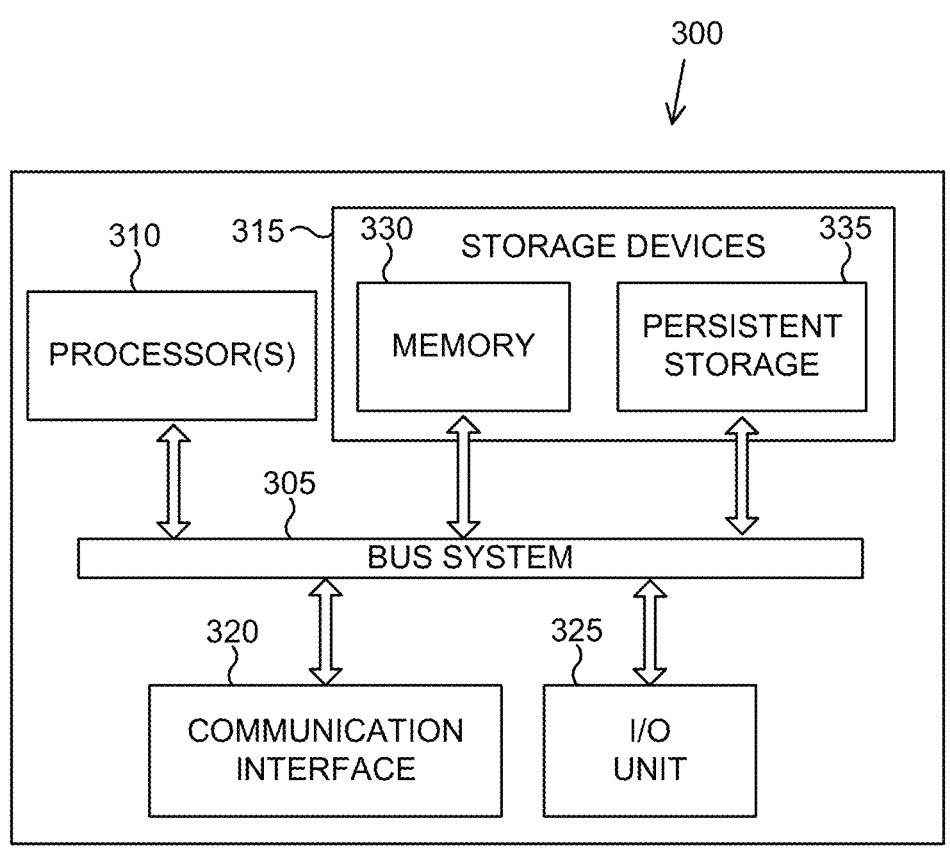
FIG. 3 illustrates an exemplary electronic device for communicating in the networked computing system according to various embodiments of this disclosure.

FIG. 3 illustrates an exemplary electronic device for communicating in the networked computing system according to various embodiments of this disclosure. In one embodiment, the electronic device 300 is a user equipment implemented as a mobile device, which can represent one of the UEs in FIG. 1.

As shown in FIG. 3, the electronic device 300 includes a bus system 305, which supports communication between at least one processing device 310, at least one storage device 315, at least one communications unit 320, and at least one input/output (I/O) unit 325.

The processing device 310 executes instructions that may be loaded into a memory 330. The processing device 310 may include any suitable number(s) and type(s) of processors or other devices in any suitable arrangement. Example types of processing devices 310 include microprocessors, microcontrollers, digital signal processors, field programmable gate arrays, application specific integrated circuits, and discreet circuitry.

The memory 330 and a persistent storage 335 are examples of storage devices 315, which represent any structure(s) capable of storing and facilitating retrieval of information (such as data, program code, and/or other suitable information on a temporary or permanent basis). The memory 330 may represent a random access memory or any other suitable volatile or non-volatile storage device(s). The persistent storage 335 may contain one or more components or devices supporting longer-term storage of data, such as a ready only memory, hard drive, Flash memory, or optical disc.

The communications unit 320 supports communications with other systems or devices. For example, the communications unit 320 could include a network interface card or a wireless transceiver facilitating communications over the network 130. The communications unit 320 may support communications through any suitable physical or wireless communication link(s).

The I/O unit 325 allows for input and output of data. For example, the I/O unit 325 may provide a connection for user input through a keyboard, mouse, keypad, touchscreen, or other suitable input device. The I/O unit 325 may also send output to a display, printer, or other suitable output device.

As described in more detail below, the electronic device 300 can serve as a shared spectrum manager in a networked computing system can generate synchronization source/slave assignments and configure synchronization signals.

Although FIG. 3 illustrates an example of an electronic device 300 in a wireless system including a plurality of base stations, such as base stations 101, 102, and 103 in FIG. 1, various changes may be made to FIG. 3. For example, various components in FIG. 3 can be combined, further subdivided, or omitted and additional components could be added according to particular needs. In addition, as with computing and communication networks, servers can come in a wide variety of configurations, and FIG. 3 does not limit this disclosure to any particular electronic device.

Initial Access in 3GPP NR System

Figure 4:
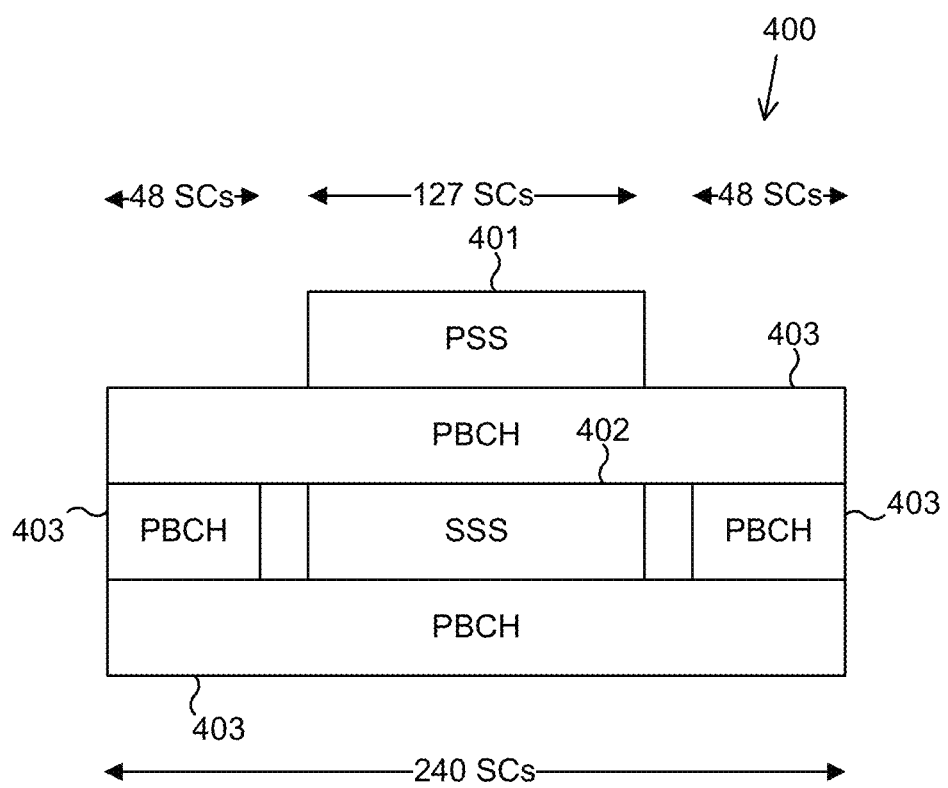
FIG. 4 illustrates the structure of a synchronization signal block according to various embodiments of this disclosure.

FIG. 4 illustrates the structure of a synchronization signal block according to various embodiments of this disclosure. The initial access in $3^{rd}$ Generation Partnership Project (3GPP) NR systems is based on the so-called synchronization signal block (SSB), which includes the primary synchronization signal (PSS), the secondary synchronization signal (SSS), and the physical broadcast channel (PBCH). The structure 400 of the SSB in NR, which occupies 240 continuous subcarriers (SCs) in the frequency domain and 4 OFDM symbols in the time domain, is given by FIG. 4. PSS 401 and SSS 402 occupy 127 subcarriers in the frequency domain, and are transmitted in the first and third symbols of the SSB, respectively. PBCH 403 is transmitted on the second and fourth symbols of the SSB, occupying 240 subcarriers. In addition, PBCH 403 is transmitted on the third symbol of SSB, occupying 48 subcarriers at each side of the SSS.

Figure 5:
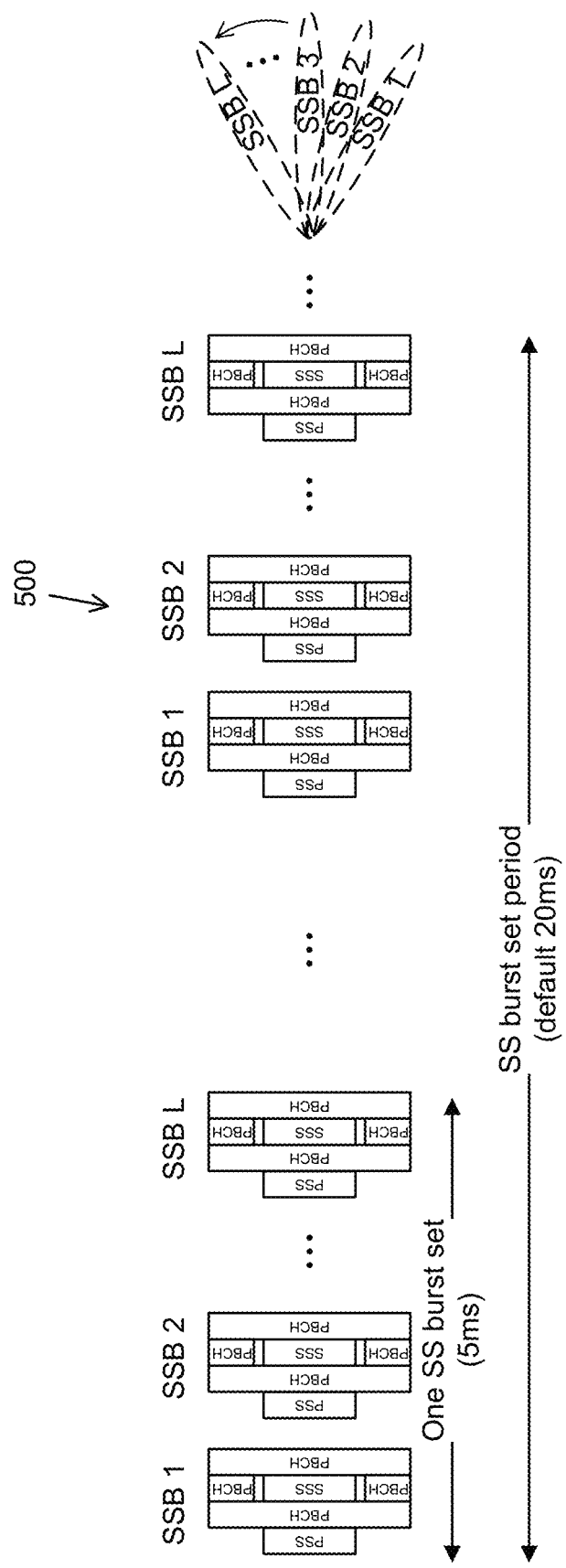
FIG. 5 illustrates the structure of a synchronization signal block burst according to various embodiments of this disclosure.

FIG. 5 illustrates the structure of a synchronization signal block burst according to various embodiments of this disclosure. For beamforming, a synchronization signal (SS) burst set is defined in NR. Within each SS burst set, different SSBs can be transmitted in different beams in a time division multiplexing (TDM) fashion, i.e. beam-sweeping for SSB. The SS burst set is transmitted periodically, with a default periodicity of 20 milliseconds (ms) for initial cell search. One example 500 of the SS burst set transmission pattern in the time domain is shown in FIG. 5, where the parameter L indicates the number of SSBs per SS burst set.

The duration for cell detection and beam selection for NR systems is quite large, as multiple SS burst set transmission periods need to be combined for synchronization, cell identifier (ID) detection, SSB measurement, and SSB index detection [38.133]. DL signal/channel design for the high frequency band communication initial access to reduce the initial access latency is preferred.

Compared to 3GPP NR system, the high frequency band communication systems operate in much higher frequency range. Narrower beams are considered for the high frequency band communication systems, which results in larger number of transmit-receiver beam pairs to be selected. In addition, symbol duration for the high frequency band communication system would be much smaller than 3GPP NR system, consider the vast amount of available spectrum in the high frequency band communication band, the impact of large CFO and PAPR.

For initial access, a device may perform one or more of synchronization, cell ID detection, measurement or beam-sweeping, based on which the device camps on a cell and selects the preferred transmit and receive beams for DL transmission. As discussed above, the high frequency band system may have considerable number of beams for highly direction transmission, which results in high complexity in beam acquisition. This motivates DL signal/channel design enabling efficient beam-sweeping and acquisition mechanism for initial access in high frequency band communication systems. Specifically, indication (e.g., beam index) and transmission schemes involve problems to be solved. The present disclosure enables efficient initial beam acquisition and initial access for wireless communication systems (e.g. in high frequency band). The disclosure relates to design of a DL signal/channel for initial access that enables multi-stage beam search. Specifically, beam index indication and for transmission with consideration for the time needed for beam switching, to support multi-stage beam search, is disclosed. The disclosure relates to design of a DL signal/channel for initial access that enables multi-stage beam acquisition. Specifically, the disclosed design supports transmission of a first synchronization signal, and a second synchronization signal and/or system information (e.g., PBCH) multiplexed in time and/or frequency manner and in different transmission beams, e.g. the first synchronization signal in wide beams associated with multiple second synchronization signals and/or system information (e.g., PBCH) transmissions in narrow beams.

Synchronization and initial beam acquisition can be accomplished by a DL signal/channel designed for initial access. In this disclosure, such a DL signal/channel is called a synchronization signal block (SSB), following the name used for NR systems. The SSB design can be used for various systems, including a system with high frequency band and OFDM waveform.

DL Signal/Channel Components and Structure

The DL signal/channel for initial access, also named as SSB in this application, can include one or more of synchronization signals such as first synchronization signals (also called PSS) or second synchronization signals (also called SSS), or channels carrying system information such as PBCH. PSS can be used for synchronization, and can include partial cell ID information and/or index of the current PSS transmission, SSS can include partial cell ID information and/or index of the current DL signal/channel transmission, and PBCH can include some essential system information such as system frame number (SFN), configuration for transmission of remaining minimum system information, etc.

Figure 6:
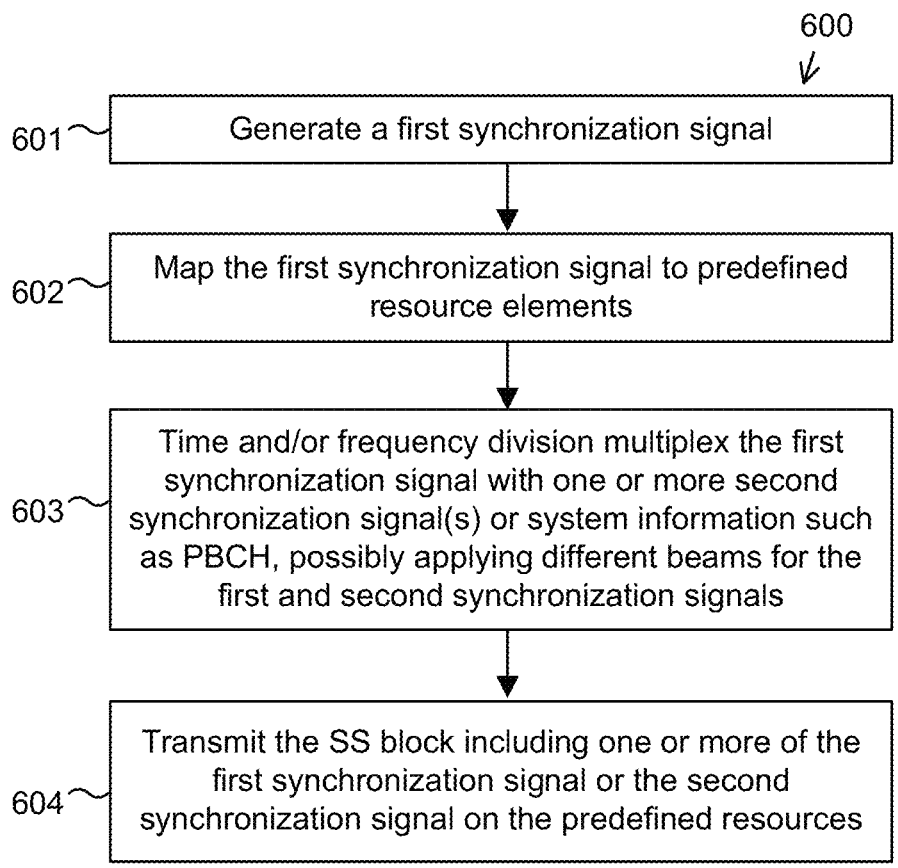
FIG. 6 illustrates a flowchart for an example of SS block generation and transmission according to embodiments of the present disclosure.

FIG. 6 illustrates a flowchart for an example of SS block generation and transmission according to embodiments of the present disclosure. The method 600 depicted in FIG. 6 is for illustration only. Other embodiments could be used without departing from the scope of this disclosure.

At operation 601, a BS generates a first synchronization signal (e.g., PSS) for an SSB. At operation 602, the generated synchronization signal is mapped to predefined resource elements for the SSB. At operation 603, the first synchronization signal can be multiplexed with at least another synchronization signal (e.g., SSS) in time and/or frequency domain. The first synchronization signal and second synchronization signal can possibly use different transmission beams. At operation 604, the generated SSB is transmitted at predefined resources. The transmission can be periodic according to a predefined periodicity.

Figure 7:
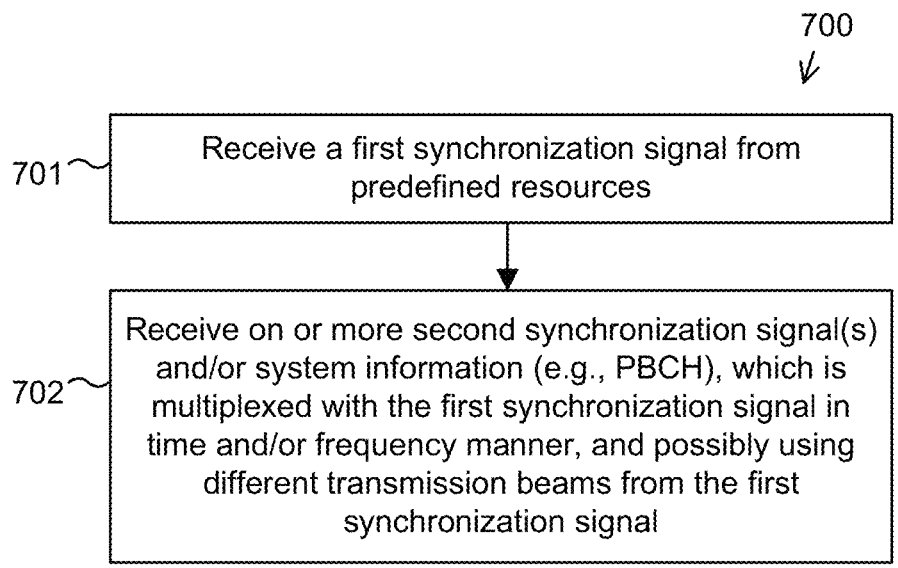
FIG. 7 illustrates a flowchart for an example of SS reception according to embodiments of the present disclosure.

FIG. 7 illustrates a flowchart for an example of SS reception according to embodiments of the present disclosure. The method 700 depicted in FIG. 7 is for illustration only. Other embodiments could be used without departing from the scope of this disclosure.

At operation 701, the UE receives a first synchronization signal (e.g. PSS), which is transmitted at a predefined resource. At operation 702, the UE receives at least a second synchronization signal, which is multiplexed with the first synchronization signal in time and/or frequency and possibly using different transmission beam(s) from the first synchronization signal.

Figure 8A:
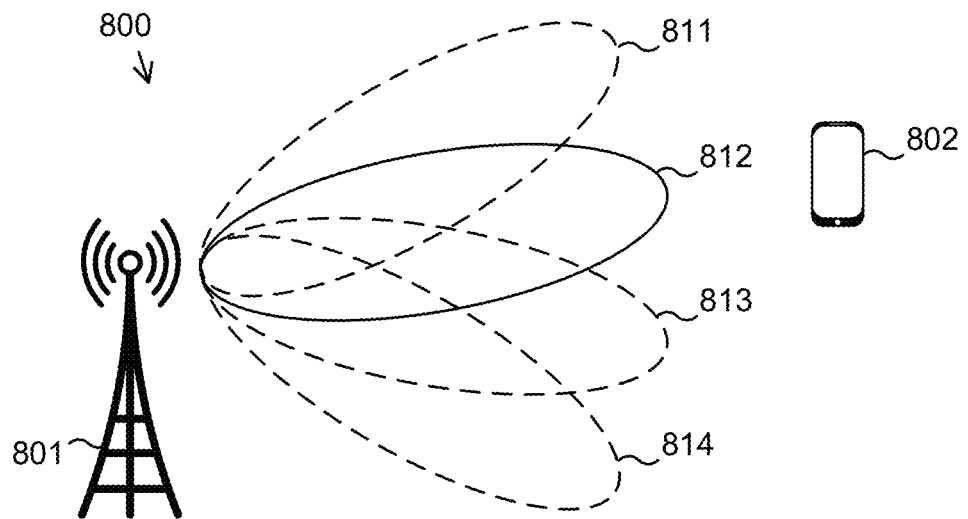
FIGS. 8A and 8B illustrate beam forming for a PSS, an SSS, and/or a PBCH according to various embodiments of this disclosure.
Figure 8B:
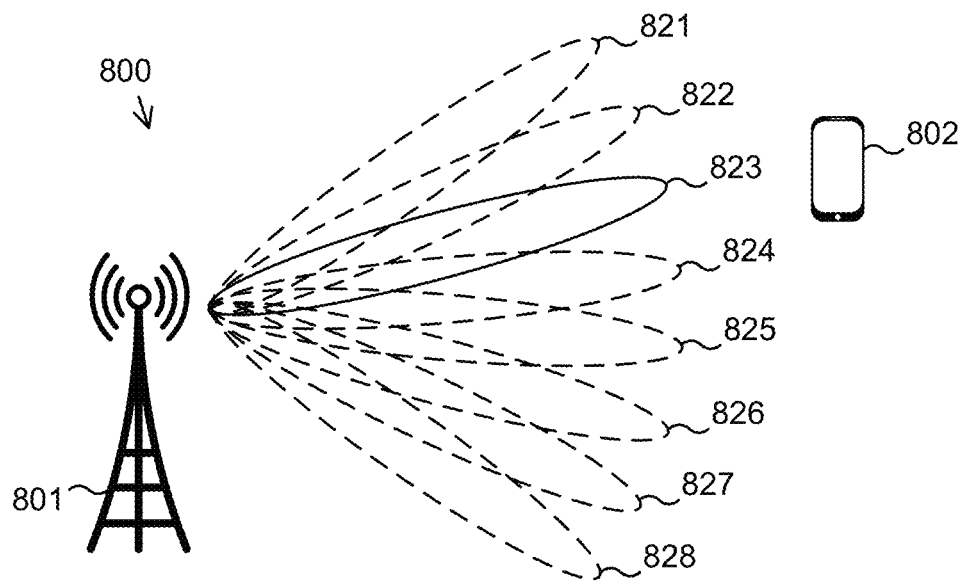

FIGS. 8A and 8B illustrate beam forming for a PSS, an SSS, and/or a PBCH according to various embodiments of this disclosure. The example 800 depicted in FIGS. 8A-8B is for illustration only. Other embodiments could be used without departing from the scope of this disclosure.

In one embodiment, the BS 801 may transmit the first synchronization signal (e.g., PSS) in one transmission beam as illustrated in FIG. 8A, on one set of predefined resources, but transmit a second synchronization signal (e.g., SSS) and/or system information (e.g., PBCH) in another transmission beam, which can be different from the beam used for the first synchronization signal, on another set of predefined resources, as illustrated in FIG. 8B. The BS 801 can transmit one of the synchronization signal (e.g., PSS) in different beams, e.g., one or more of beams 811, 812, 813 and 814. Another set of beams, e.g., one or more of beams 821, 822, 823, 824, 825, 826, 827 and 828, can be used to transmit another synchronization signal (e.g., SSS) and/or system information (e.g., PBCH). The two set of beams can have different beamwidths. For example, beams 811, 812, 813 and 814 can have wider beamwidth than beams 821, 822, 823, 824, 825, 826, 827 and 828. In another embodiment, there can be relationship between the two set of beams. For example, the direction of beams 821 and 822 belongs to the direction that can be covered by beam 811. Similarly, beams 823 and 824 correspond to beam 812, beams 825 and 826 correspond to beam 813, and beams 827 and 828 correspond to beam 814, respectively.

Figure 9:
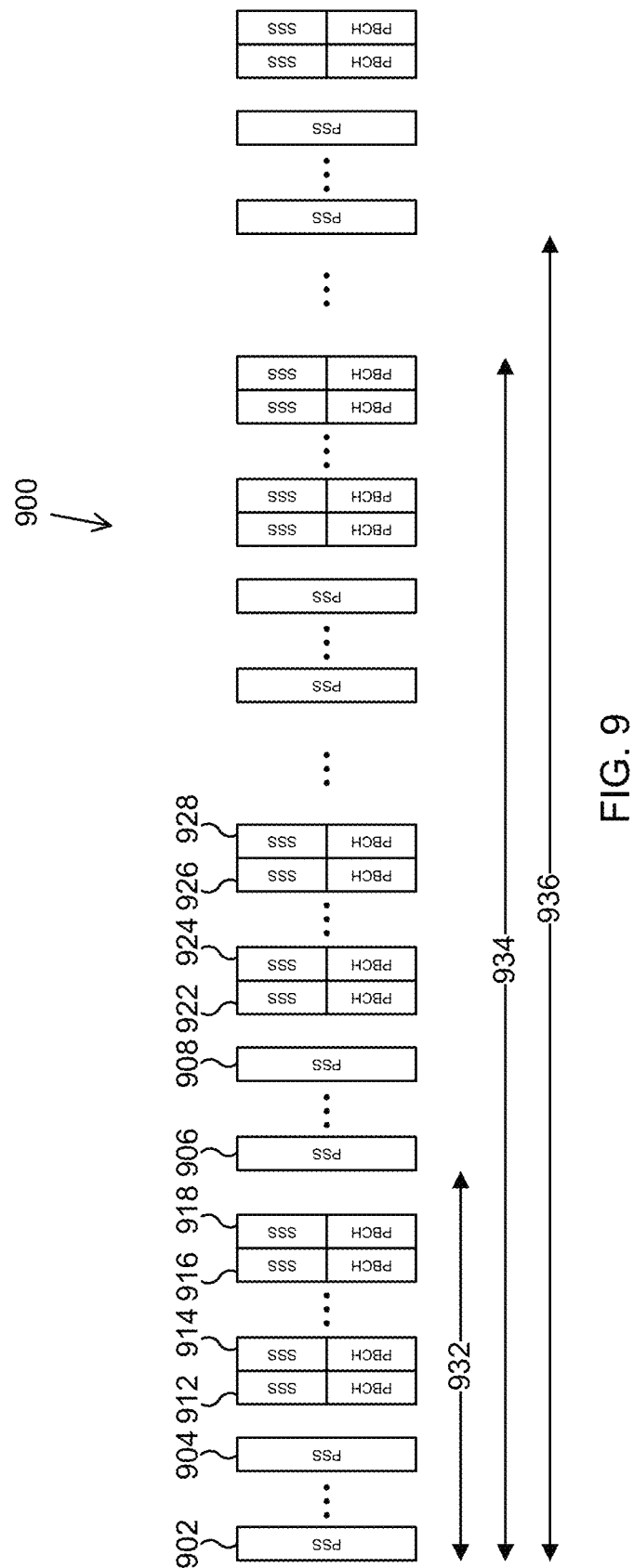
FIG. 9 illustrates an exemplary transmission scheme for a PSS, an SSS, and/or a PBCH according to various embodiments of this disclosure.

FIG. 9 illustrates an exemplary transmission scheme for a PSS, an SSS, and/or a PBCH according to various embodiments of this disclosure. The example 900 depicted in FIG. 9 is for illustration only. Other embodiments could be used without departing from the scope of this disclosure.

In one embodiment, a certain number of the first synchronization signals, e.g., synchronization signals 902 and/or 904, can be transmitted first using different transmission beams. One or more of the second synchronization signal (e.g., SSS) or system information (e.g., PBCH), e.g., 912 and 914 associated with 902, and 916 and 918 associated with 904, can be transmitted following the transmission of the associated first synchronization signals, using the beams associated with the beams used for the preceding first synchronization signal. The set of these transmissions 932 can be defined as a sub-burst, which can correspond to a subset of transmission beams supported by the cell for the first synchronization signal. A transmission burst 934 includes one or more of sub-bursts corresponding to a subset of transmission beams. The transmission burst 934 includes the transmissions of DL signals/channels using all supported beams. The transmission burst can be transmitted periodically, with periodicity 936. As one example, the sub-burst 932 be the same as burst 934. A predefined number of repetitions can be used for one or more first synchronization signals (e.g., 902, 904, 906, 908), second synchronization signals and system information such as PBCH (e.g., 912, 914, 916, 918, 922, 924, 926, 928). The resources for transmission of synchronization signals and system information (e.g. PBCH) are predefined, and there can exist a predefined relationship between the resource for transmission of a first synchronization signal and the resource for transmission of an associated second synchronization signal and/or system information (e.g. PBCH) using beams associated with those used for the first synchronization signal. The delay between the start/end of transmission 902 and the start/end of transmission 912, and the delay between start/end of transmission 902 and the start/end of transmission 914, can be predefined.

Indication Information Carried by the DL Signal/Channel

For the indication information, in one embodiment, the beam index for one or more of the synchronization signals or system information (e.g., PBCH) can be indicated explicitly.

Figure 10:
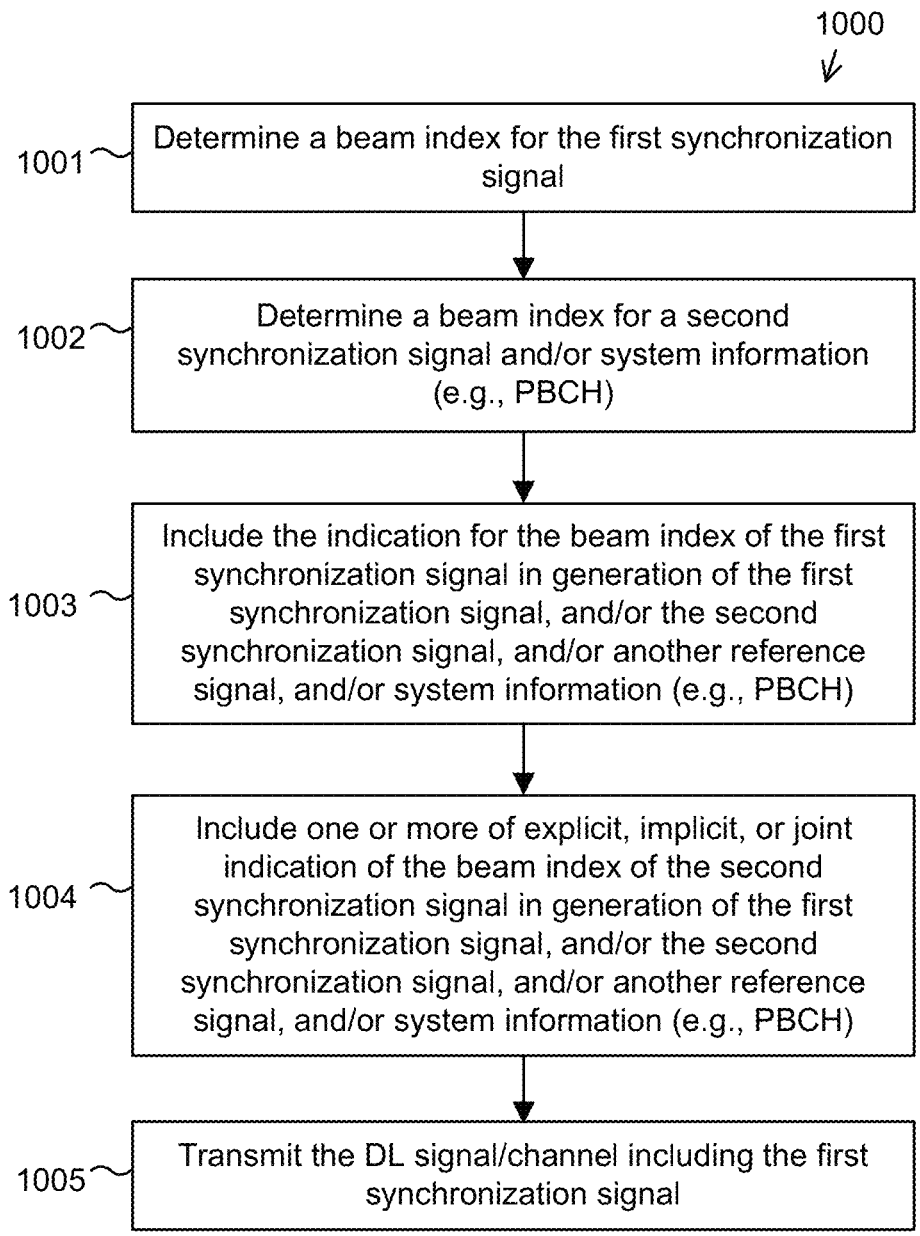
FIG. 10 illustrates a flowchart for an example of beam index determination and SS generation according to embodiments of the present disclosure.

FIG. 10 illustrates a flowchart for an example of beam index determination and SS generation according to embodiments of the present disclosure. The method 1000 depicted in FIG. 10 is for illustration only. Other embodiments could be used without departing from the scope of this disclosure.

At operation 1001, the BS determines the beam index for the first synchronization signal. At operation 1002, the BS determines the beam index for the second synchronization signal and/or system information (e.g., PBCH). At operation 1003, the beam index information for the first synchronization signal is inserted to be carried by one or more of the synchronization signals, and/or another reference signal, and/or system information (e.g., PBCH). At operation 1004, the indication for the beam index of the second synchronization signal and/or system information (e.g., PBCH) is included in the generation of one or more of the synchronization signals, and/or another reference signal, and/or system information (e.g., PBCH). In one example of operations 1002 and 1003, both the beam index for the first synchronization signal and the beam index for the second synchronization signal and/or system information (e.g., PBCH) are explicitly indicated. In one example, K1 bits can be used for indication of the first synchronization signal beam index, e.g., K1=⌈log$_2$ (M1)⌉, with K1 being the number of beams used for the first synchronization signal transmissions and ⌈ ⌉ being the ceiling function, and K1 bits can be used for indication of the beam index or indices for one or more of the second synchronization signal or system information (e.g. PBCH) associated with each first synchronization signal transmission, e.g., K2=⌈log$_2$(M2)⌉, with M2 being the number of beams used for one or more of the second synchronization signal or system information (e.g., PBCH) associated with each first synchronization signal transmission. In other words, the total number of finer (narrower) beam(s) used for one or more of the second synchronization signal or system information (e.g., PBCH) transmission can be M1*M2. Besides separate indication for beam index or indices for the first synchronization signal and beam index or indices for the second synchronization signal and/or system information (e.g., PBCH), the beam index or indices can be jointly coded by using ⌈log$_2$ (M1*M2)⌉ bits. As an example of operations 1003 and 1004, the beam index indication information can be carried in the first synchronization signal, and/or the second synchronization signal, and/or another reference signal, and/or system information (e.g., PBCH). For example, the first synchronization signal can carry at least part of the beam index information. In current NR systems, there are three sequences for PSS, and the cell selects one out of the three depending on the cell ID modulo 3. As one example for high frequency systems, there can be 3N sequences for PSS, where beam index modulo N and cell ID modulo 3 can be jointly used for determination of the PSS sequence, where N can be any predefined integer. In another example, the second synchronization signal can carry at least part of the beam index information. For example, more sequences for SSS can be defined. In current NR systems, the SSS is generated based on two M-sequences, where one M-sequence has 3 possible sequences and the other has 112 possible sequences. In one example, the SSS can be generated based on the same two M-sequences, where one M-sequence can have 3N possible sequences, and the other can have 112 possible sequences, where beam index modulo N and cell ID can be jointly used to determine the SSS sequence. As another example, the reference signal for system information (e.g., PBCH) demodulation (e.g., demodulation reference signal or "DMRS") and/or master information block (MIB) in PBCH can be used for carrying the beam index indication, similar to the current NR design. Alternatively, a new synchronization signal or reference signal can be introduced, which can be multiplexed with PSS/SSS/PBCH in time and/or frequency manner, to carry the beam index indication. In some examples, part of the beam index indication information can be carried in one signal/channel, while the rest of the indication information can be carried in another signal/channel. At operation 1004, the first synchronization signal and one or more of the second synchronization signals or system information (e.g., PBCH) are time/frequency multiplexed, and mapped to predefined resources. At operation 1005, the DL signal/channel for initial access is transmitted.

Figure 11:
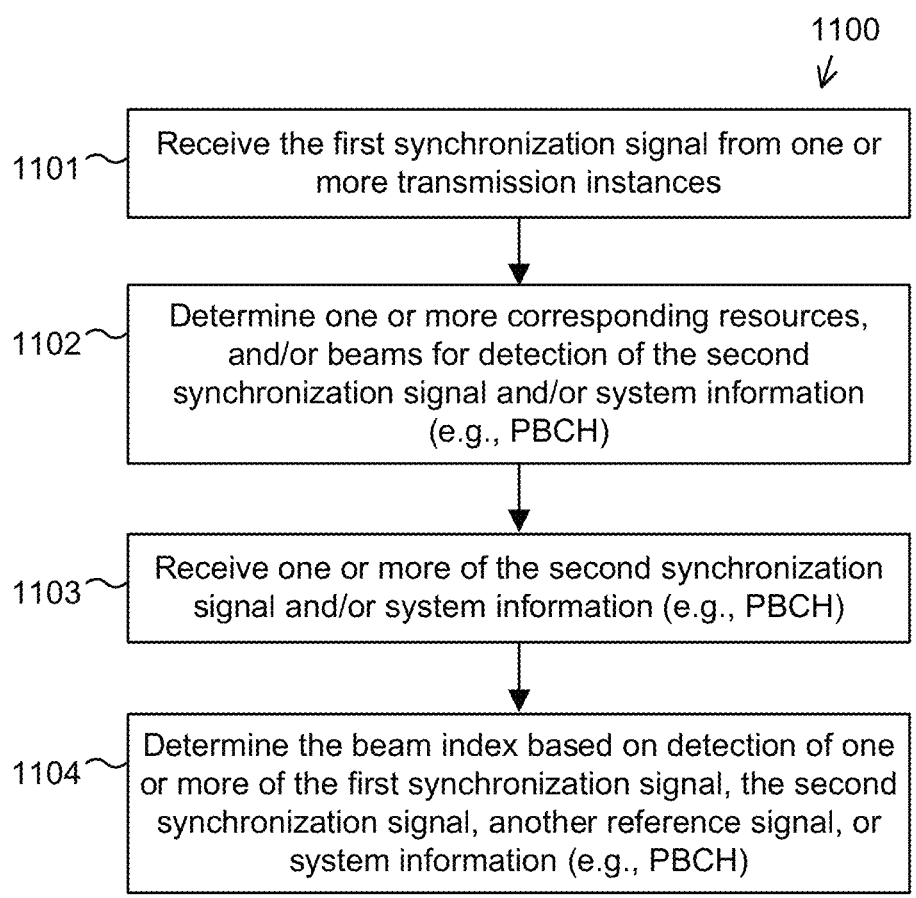
FIG. 11 illustrates a flowchart for an example of beam index detection according to embodiments of the present disclosure.

FIG. 11 illustrates a flowchart for an example of beam index detection according to embodiments of the present disclosure. The method 1100 depicted in FIG. 11 is for illustration only. Other embodiments could be used without departing from the scope of this disclosure.

At operation 1101, the UE detects the first synchronization signal from at least one transmission instance. At operation 1102, the UE determines one or more resources and/or beams for reception of the second synchronization signal and/or system information (e.g., PBCH). In one example, the UE can perform receive beam sweeping and determine the reception beams for detection of the second synchronization signal and/or system information (e.g., PBCH), based on reception of the first synchronization signal. In one example, the potential set of resources for detection of the second synchronization signal and/or system information (e.g., PBCH) can be obtained based on predefined relationship between resources for the first synchronization signal and resources for the associated second synchronization signal and/or system information (e.g., PBCH). At operation 1103, the UE receives one or more of the second synchronization signal or system information (e.g., PBCH). At operation 1104, the UE determines the beam index based on the detection of the first synchronization signal, and/or the second synchronization signal, and/or another reference signal, and/or system information (e.g., PBCH).

Figure 12:
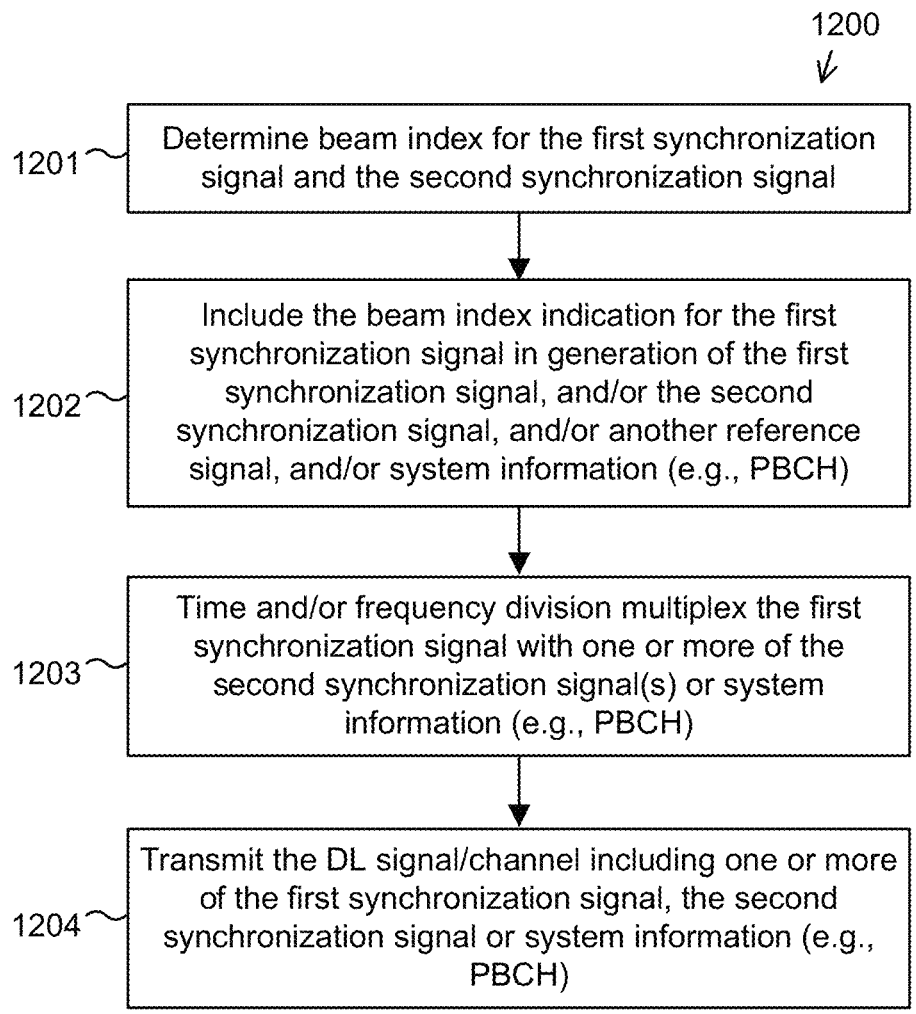
FIG. 12 illustrates a flowchart for an example of beam index determination and SS generation according to embodiments of the present disclosure.

FIG. 12 illustrates a flowchart for an example of beam index determination and SS generation according to embodiments of the present disclosure. The method 1200 depicted in FIG. 12 is for illustration only. Other embodiments could be used without departing from the scope of this disclosure.

At operation 1201, the BS determines the beam index for the first synchronization signal. At operation 1202, the beam index information for the first synchronization signal is inserted to be carried by one or more of synchronization signals or system information (e.g., PBCH). For example, the beam index for first synchronization signal transmission can be explicitly indicated, e.g., using K1=⌈log$_2$(M1)⌉ bits, with M1 being the number of beams used for first synchronization signal transmissions, while the beam index for one or more of the second synchronization signal or system information (e.g., PBCH) transmission is not explicitly indicated. The beam index for one or more of the second synchronization signal or system information (e.g., PBCH) can be obtained based on the relationship between the resources for the associated first synchronization signal and resources for the second synchronization signal and/or system information (e.g., PBCH). As an example of operation 1202, the beam index indication information can be carried in the first synchronization signal, and/or the second synchronization signal, and/or another reference signal, and/or system information (e.g., PBCH). For example, the reference signal for system information demodulation (e.g., DMRS) can be used for carrying the beam index indication. Alternatively, a new reference signal can be introduced, which can be multiplexed with PSS/SSS/PBCH in time and/or frequency manner, to carry the beam index indication. In some examples, part of the beam index indication information can be carried in one signal/channel, while the rest of the beam indication information can be carried in another signal/channel. At operation 1203, the first synchronization signal and one or more of the second synchronization signal(s) or system information (e.g., PBCH) are time/frequency multiplexed, and mapped to predefined resources. At operation 1204, the DL signal/channel for initial access is transmitted.

Figure 13:
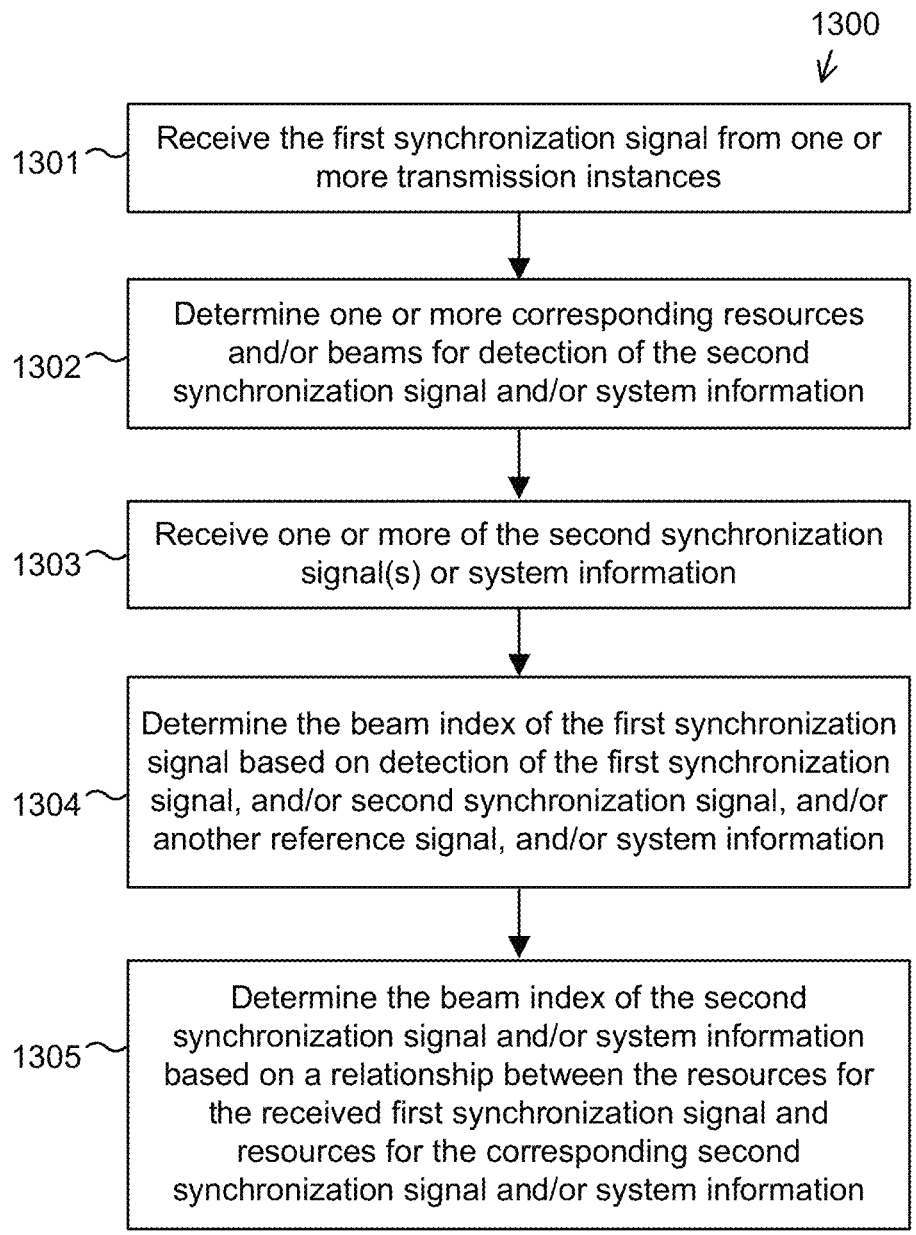
FIG. 13 illustrates a flowchart for an example of PSS, SSS, and/or PBCH reception and beam index detection according to embodiments of the present disclosure.

FIG. 13 illustrates a flowchart for an example of PSS, SSS, and/or PBCH reception and beam index detection according to embodiments of the present disclosure. The method 1300 depicted in FIG. 13 is for illustration only. Other embodiments could be used without departing from the scope of this disclosure.

At operation 1301, the UE detects the first synchronization signal from at least one transmission instance. At operation 1302, the UE determines one or more resources for detection of one or more of the second synchronization signal(s) or system information (e.g., PBCH). In one example, the UE can perform receive beam sweeping and determine the reception beams for detection of the second synchronization signal and/or system information (e.g., PBCH), based on reception of the first synchronization signal. In one example, the potential set of resources for detection of the second synchronization signal and/or system information (e.g., PBCH) can be obtained based on a predefined relationship between resources for the first synchronization signal and resources for the associated second synchronization signal and/or system information (e.g., PBCH). At operation 1303, the UE receives one or more of the second synchronization signals or system information (e.g., PBCH). At operation 1304, the UE determines the beam index for the first synchronization signal based on the detection of the first synchronization signal, and/or the second synchronization signal, and/or another reference signal, and/or system information (e.g., PBCH). At operation 1305, the UE determines the beam index for the second synchronization signal and/or system information (e.g., PBCH) based on the relationship between resources for the associated first synchronization signal and the resources for the corresponding second synchronization signal and/or system information (e.g., PBCH). For example, based on the delay between the start of the associated first synchronization signal, and the start of the second synchronization signal and/or system information (e.g., PBCH) transmission, the UE can know which one of the second synchronization signal and/or system information (e.g., PBCH) is considered, assuming there are multiple transmissions of the second synchronization signal and/or system information (e.g., PBCH) associated with one of the first synchronization signal.

Time for Beam Switching for DL Signal/Channel

FIG. 14 illustrates a flowchart for an example of transmission beam switching during guard time according to embodiments of the present disclosure. The method 1400 depicted in FIG. 14 is for illustration only. Other embodiments could be used without departing from the scope of this disclosure.

At operation 1401, the BS transmits the first synchronization signal with one or more transmission beams on predefined resources. At operation 1402, depending on the time to switch the transmission beam, the BS determines the guard time for the beam switching. At operation 1403, the BS performs the transmission beam switching during the guard time.

FIG. 15 illustrates an example of a guard time according to embodiments of the present disclosure. The example 1500 depicted in FIG. 15 is for illustration only. Other embodiments could be used without departing from the scope of this disclosure.

In one example, the guard time can be empty symbols 1501 and/or 1502 reserved by the BS, as show in FIG. 15. The guard time can be different for different transmissions, e.g., a different guard time is reserved between symbols for first synchronization signals and between symbols for one or more of the second synchronization signals or system information (e.g., PBCH). FIG. 15 is just an illustrative example. In other examples where different PSS transmissions use different transmission beams, the guard time may be reserved between these PSS transmissions.

FIGS. 16A, 16B and 16C illustrate examples of a guard time according to embodiments of the present disclosure. The examples 1600, 1610 and 1620 depicted in FIGS. 16A-16C are for illustration only. Other embodiments could be used without departing from the scope of this disclosure.

In an alternative example, the guard time can be a partial symbol 1601, 1611 or 1621 punctured by the BS. Some of the symbols or parts of the symbols can be punctured for the beam switching. For example, the last symbol(s) 1601 or the ending part of last symbol before the beam switching can be punctured for the guard time, as illustrated in FIG. 16A. Alternatively, the first symbol(s) 1611 or the starting part of the first symbol for transmission in a next different beam can be punctured for the beam switching, as illustrated in FIG. 16B. In this option, the puncturing operation can be transparent to the receiver. As a special example, if the duration for beam switching is quite short, beam switching can be resolved within the cyclic prefix (CP) duration. For beam switching between different signals/channels, different methods can be used for reserving the guard time. For example, symbol puncturing 1621 can be used for beam switching of the first synchronization signal transmission, while guard symbol 1622 can be inserted between one or more of the second synchronization signal or system information (e.g., PBCH) transmission with different transmit beams, as shown in FIG. 16C. Note that the examples in FIG. 16C should be considered in an inclusive manner, while other options can be used as well, e.g., symbol puncturing for beam switching between one or more of the second synchronization signal or system information (e.g., PBCH) transmissions, and symbol puncturing for beam switching between the first synchronization signal transmissions.

Figure 17:
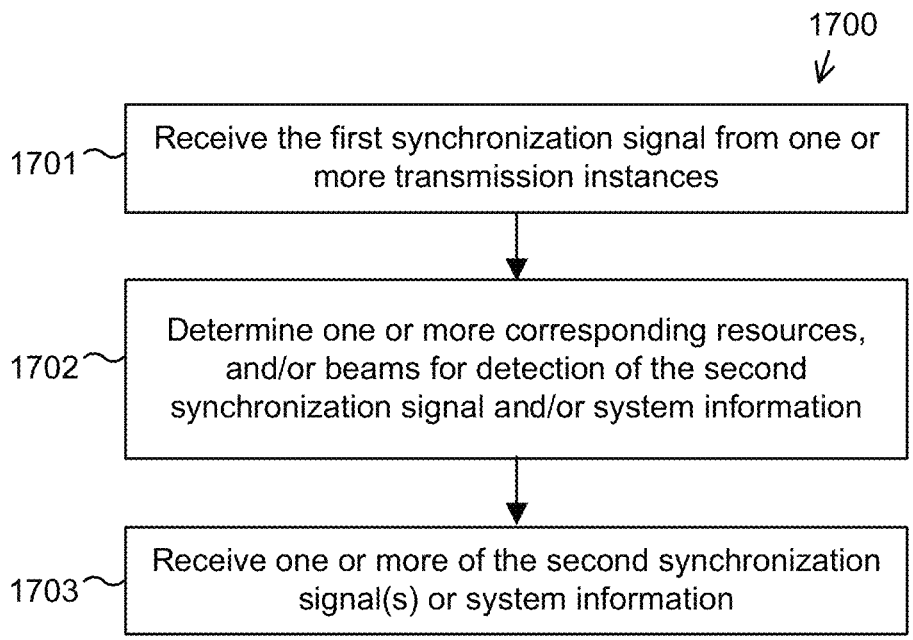
FIG. 17 illustrates a flowchart for an example of reception of a DL signal/channel for initial access according to embodiments of the present disclosure.

FIG. 17 illustrates a flowchart for an example of reception of a DL signal/channel for initial access according to embodiments of the present disclosure. The method 1700 depicted in FIG. 17 is for illustration only. Other embodiments could be used without departing from the scope of this disclosure.

At operation 1701, the UE detects the first synchronization signal from at least one transmission instance. At operation 1702, the UE determines one or more resources for detection of one or more of the second synchronization signal or system information (e.g., PBCH). In one example, the UE can perform receive beam sweeping and determine the reception beams for detection of the second synchronization signal or system information (e.g., PBCH), based on reception of the first synchronization signal. In one example, the potential set of resources for detection of the second synchronization signal and/or system information (e.g., PBCH) can be obtained based on a predefined relationship between resources for the first synchronization signal and resources for the associated second synchronization signal and/or system information (e.g., PBCH). In one example, the guard time has been considered in the definition of the resources for the DL signal/channel transmission, i.e., predefined resources will not include the guard time. In this example, the UE will receive the DL signal/channels on these predefined resources which take into account the guard time. In another example, the guard time for transmission beam switching for the DL signal/channel can be transparent to the UE (e.g., when the guard time duration is a partial symbol), and thus the UE determines the predefined resources and assumes that the BS keeps transmitting the DL signal/channel on the predefined resources. At operation 1703, the UE receives one or more of the second synchronization signal or system information (e.g., PBCH).

Figure 18A:
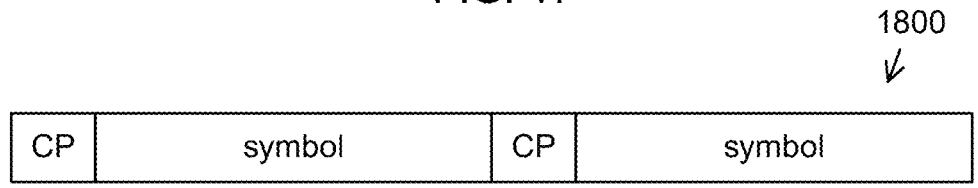
FIGS. 18A-18B illustrate examples of time domain repetition for a synchronization signal suitable for the process illustrated by FIG. 6.
Figure 18B:
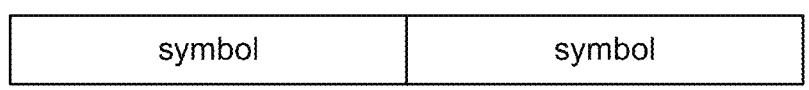

FIGS. 18A and 18B illustrate examples of repeated PSS symbols for the DL signal/channel for initial access according to embodiments of the present disclosure. The examples

1800 and 1810 depicted in FIGS. 18A-18B are for illustration only. Other embodiments could be used without departing from the scope of this disclosure.

Referring back to operation 602 in FIG. 6, the first synchronization signal can be repeated at least in one of time and frequency domains. Alternatively, the first synchronization signal can be mapped to the resource elements without repetitions. FIGS. 18A-18B illustrate examples of time domain repetition, where there can be a CP at the beginning of each repeated symbol (FIG. 18A), or there can be no CP between repeated symbols (FIG. 18B), but where the symbol before can be used as a "long" CP.

Figure 19:
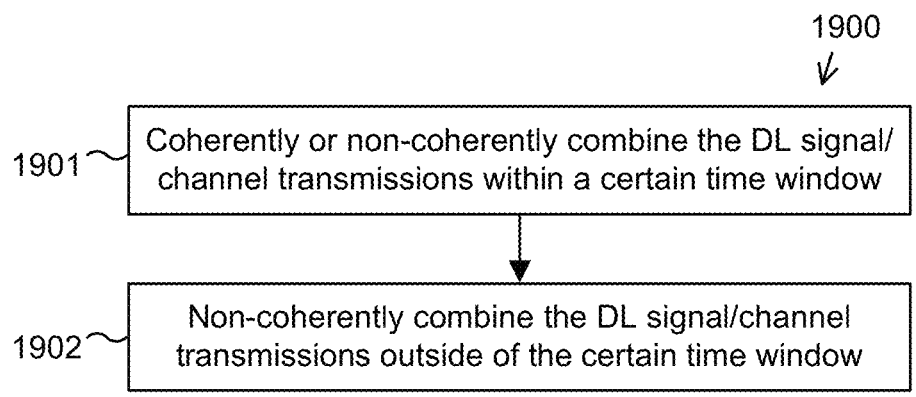
FIG. 19 illustrates a flowchart for an example of UE detection of a DL signal/channel with repetitions according to embodiments of the present disclosure.

FIG. 19 illustrates a flowchart for an example of UE detection of a DL signal/channel with repetitions according to embodiments of the present disclosure. The method 1900 depicted in FIG. 19 is for illustration only. Other embodiments could be used without departing from the scope of this disclosure.

It can be predefined one or more transmissions of the first synchronization signal, the second synchronization signal, or system information (e.g. PBCH) are quasi co-located (QCLed) or use the same transmission beam. In one example, in operation 1901, the UE can perform coherently or non-coherent combining for all transmission instances of the DL signal/channel. Alternatively, the UE can coherently combine the transmissions within a certain time window, which is no larger than the predefined number of repetitions being QCLed or using the same transmission beam. For repetitions outside of that certain time window (e.g., transmitted in different periods, or outside of the channel coherence time), in operation 1902 the UE can perform non-coherent combining of the signals/channels. In addition, the relationship between transmission beams used for the second synchronization signal and for system information (e.g., PBCH) symbols can be predefined, e.g., the second synchronization signal immediately preceding the system information (e.g., PBCH) symbols use the same transmission beam. Then the UE can use the second synchronization signal for channel estimation for system information (e.g., PBCH) demodulation. In one example, no additional reference signal is added to the symbols carrying system information (e.g., PBCH). In another example, QCL is not assumed for transmissions of the first synchronization signal and transmissions of the second synchronization signal or system information (e.g. PBCH). For example, the transmissions of the first synchronization signal and transmissions of the second synchronization signal or system information (e.g., PBCH) may use different transmission beams and would not have QCL assumption. Certain PSS symbols can be defined to be QCLed, and certain transmissions of the second synchronization signal and/or system information (e.g., PBCH) can be defined to be QCLed.

FIGS. 20A through 20E illustrate examples of multiplexing for PSS, SSS and PBCH according to embodiments of the present disclosure. The examples 2000, 2010, 2020, 2030 and 2040 depicted in FIGS. 20A-20E are for illustration only. Other embodiments could be used without departing from the scope of this disclosure.

Referring back to operation 603 in FIG. 6, multiplexing for PSS, SSS and PBCH may be TDM and/or FDM. For example, PSS and SSS can be either multiplexed in FDM manner or in TDM manner. PBCH can be multiplexed with PSS/SSS in TDM, FDM, or TDM and FDM manner. The latter case of multiplexing in both TDM and FDM manner is similar to the design in NR system, where PBCH can be transmitted in symbols different from SSS symbols, and additionally multiplexed with SSS in frequency domain on the symbols with SSS transmission. FIGS. 20A-20E are diagrams illustrating some examples of the multiplexing methods for PSS, SSS and PBCH. In the example 2000 of FIG. 20A, one or more PSS, SSS and PBCH are multiplexed in TDM manner. In some other examples, frequency bandwidth for the high frequency band communication system may be divided into a series of non-overlapping frequency subcarriers, and different numbers of subcarriers can be allocated for PSS, SSS and/or PBCH transmissions. For instance, as shown by the examples 2010, 2030 and 2040 in FIGS. 20B, 20D and 20E, respectively, PSS and SSS/PBCH can be multiplexed in frequency domain. A guard band (GB) can be possibly added between subcarriers allocated for PSS and SSS/PBCH. In another example shown in FIG. 20C, SSS and PBCH can be multiplexed in frequency domain, while PSS is multiplexed with SSS/PBCH in time domain.

FIGS. 21A through 21I illustrate examples of multiplexing for PSS, SSS and PBCH, with repeated PSS, SSS and/or PBCH according to embodiments of the present disclosure. The examples 2100, 2110, 2120, 2130, 2140, 2150, 2160, 2170 and 2180 depicted in FIGS. 21A-21I are for illustration only. Other embodiments could be used without departing from the scope of this disclosure.

Figures 20A, 20B, 20C, 20D, 20E:
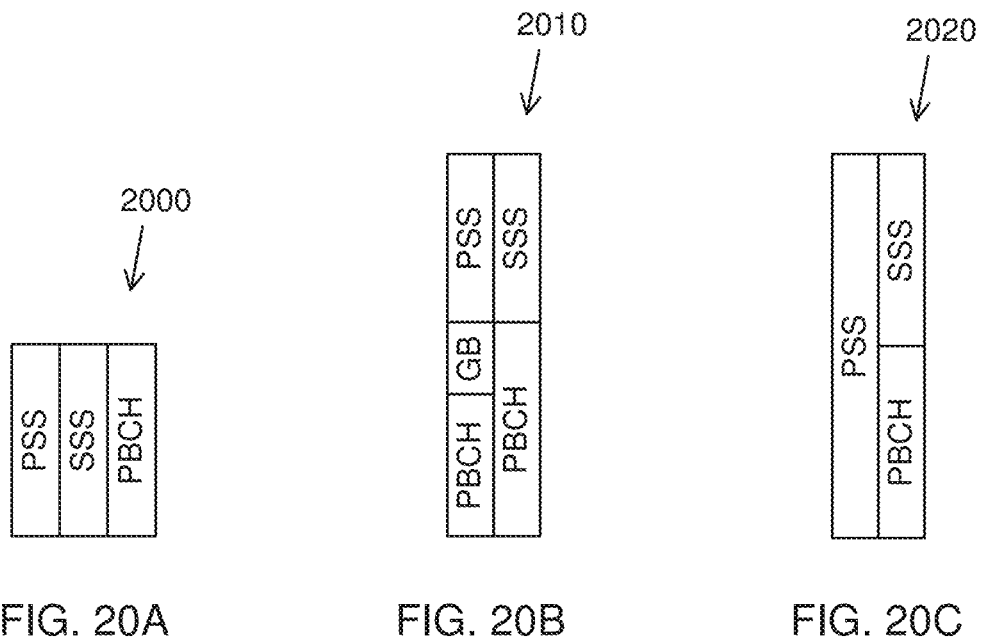
FIGS. 20A-20E are diagrams illustrating some examples of the multiplexing methods for PSS, SSS and PBCH for the process illustrated by FIG. 6.
Figures 21A, 21B, 21C, 21D, 21E, 21F:
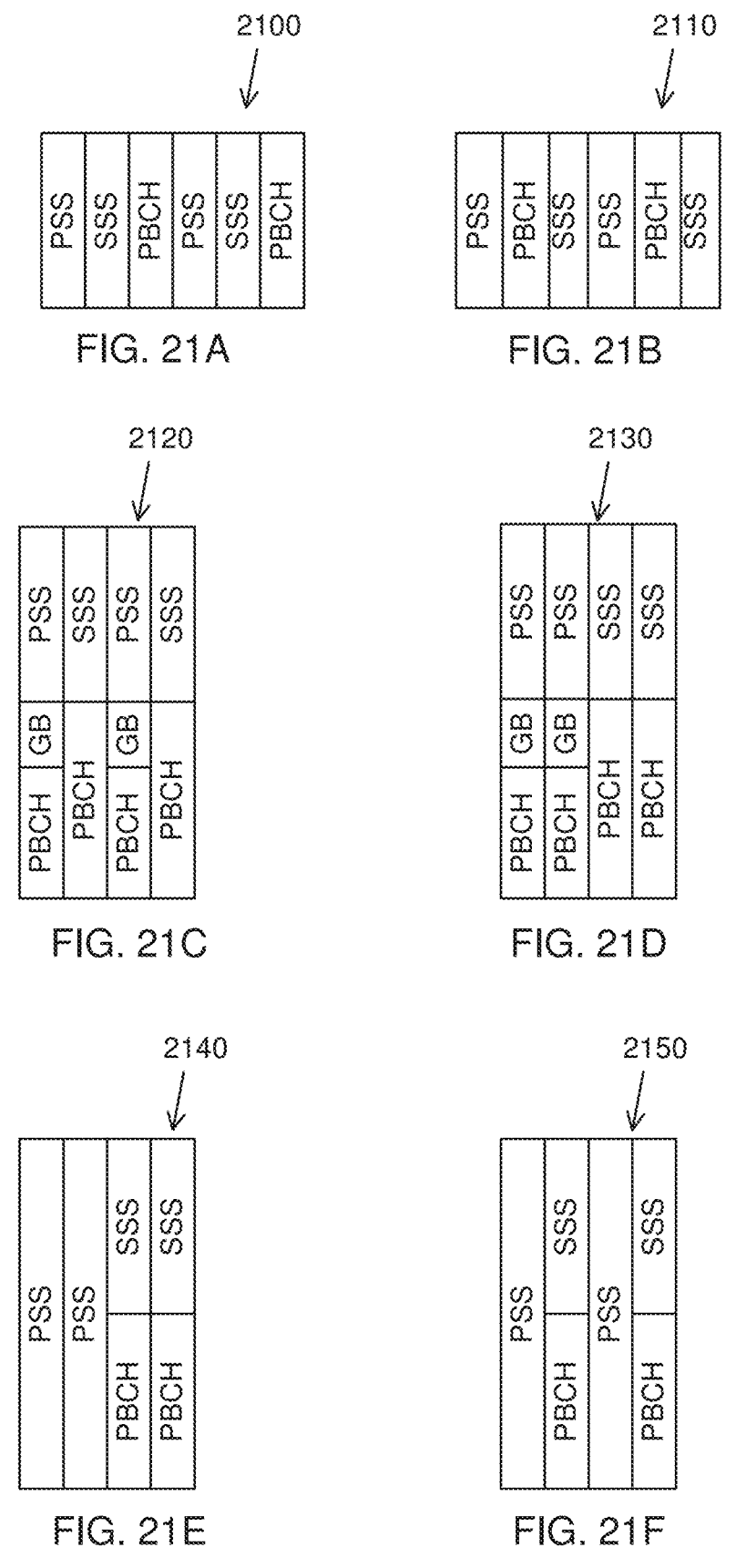
Figures 21G, 21H, 21I:
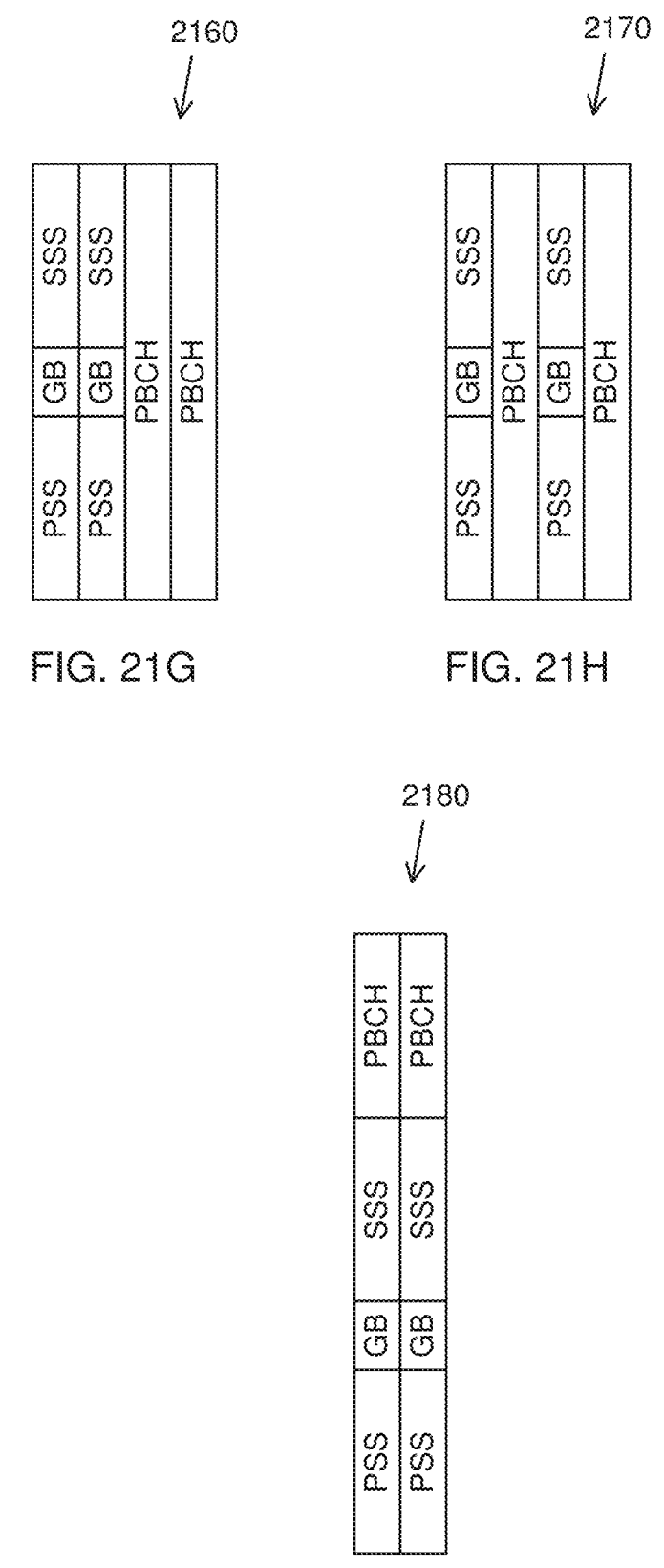

For embodiments where PSS, SSS or PBCH is repeated, FIGS. 21A through 21I illustrate some examples, where FIGS. 21A and 21B correspond to FIG. 20A, FIGS. 21C and 21D correspond to FIG. 20B, FIGS. 21E and 21F correspond to FIG. 20C, FIGS. 21G and 21H correspond to FIG. 20D, and FIG. 21I corresponds to FIG. 20E. FIGS. 21A through 21I are for illustrative purpose, and different numbers of repetitions can be adopted for PSS, SSS and PBCH per transmission of the DL signal/channel for initial access. Moreover, the number of repetitions for PSS, SSS and PBCH can be different, e.g., more repetitions for PSS compared to SSS/PBCH.

In one embodiment, there can be multiple numbers of repetitions supported for PSS, SSS and PBCH. For example, systems operating on different frequency bands can adopt different numbers of repetitions for PSS, SSS and PBCH. The number of repetitions for PSS/SSS/PBCH can be predefined. In one example, different number of repetitions for PSS/SSS/PBCH can be predefined for different frequency bands, e.g. N1 repetitions defined for carrier frequency range 1 (e.g., <3 GHz), N2 repetitions defined for carrier frequency range 2 (e.g., 3-6 GHz), N3 repetitions defined for carrier frequency range 3 (e.g., 6-52.6 GHz), etc. In another example, one or more SSS/PBCH transmissions can be associated to one PSS transmission. The multiple SSS/PBCH transmissions can be repeated transmissions with SSS/PBCH symbols being the same across the multiple transmissions, or alternatively can be multiple SSS/PBCH symbols carrying different information (e.g., different beam indexes), e.g., N SSS/PBCH transmissions with each transmission repeated M times, where N and M can be any integers. The number of SSS/PBCH transmissions associated with one PSS (e.g., parameter N above) and/or the number of repetitions for each SSS/PBCH transmission (e.g., parameter M above) can be predefined, and can be different for different frequency bands.

Beamforming and Transmission of the DL Signal/Channel

Similar to NR system, beamforming can be supported for the DL signal/channel for initial access to compensate the high path and penetration losses.

Figure 22:
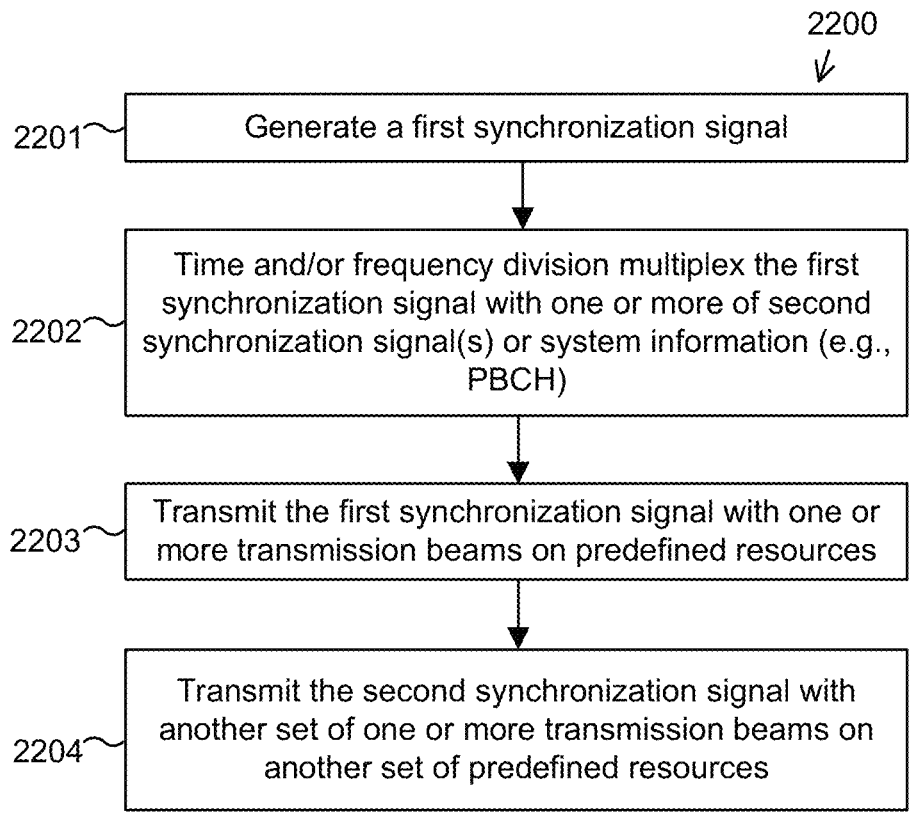
FIG. 22 illustrates a flowchart for an example of generation and transmission for DL signal/channel for initial access according to embodiments of the present disclosure.

FIG. 22 illustrates a flowchart for an example of generation and transmission for DL signal/channel for initial access according to embodiments of the present disclosure. The method 2200 depicted in FIG. 22 is for illustration only. Other embodiments could be used without departing from the scope of this disclosure.

At operation 2201, the BS generates a synchronization signal. At operation 2202, the synchronization signal is multiplexed with at least one other synchronization signal, as described above. At operation 2203, the BS transmits the first synchronization signal using one or more transmission beams on predefined resources. At operation 2204, the BS transmits the second synchronization signal using one or more other transmission beams, which can be different from the transmission beams used for the first synchronization signal, on another set of predefined resources.

As an example of the method 2200, the transmission of one or more of the synchronization signals or system information (e.g. PBCH) can be periodic. In one example, different periodicities can be adopted for different synchronization signals and system information (e.g., PBCH). In another example, different periodicities can be adopted for different frequency bands.

In one embodiment of the method 2200, the predefined resource for the first synchronization signal transmission at operation 2203 using one transmission beam (e.g., one of beams 811, 812, 813 and 814 in FIG. 8A) and can be followed by resources for transmission of one or more other signals/channels in the SSB, e.g., the second synchronization signals and/or system information (e.g., PBCH), using transmission beams associated to the beam used for the first synchronization signal (e.g., one of beam pairs {821, 822}, {823, 824}, {825, 826}, {827, 828} respectively in FIG. 8B).

Figure 23:
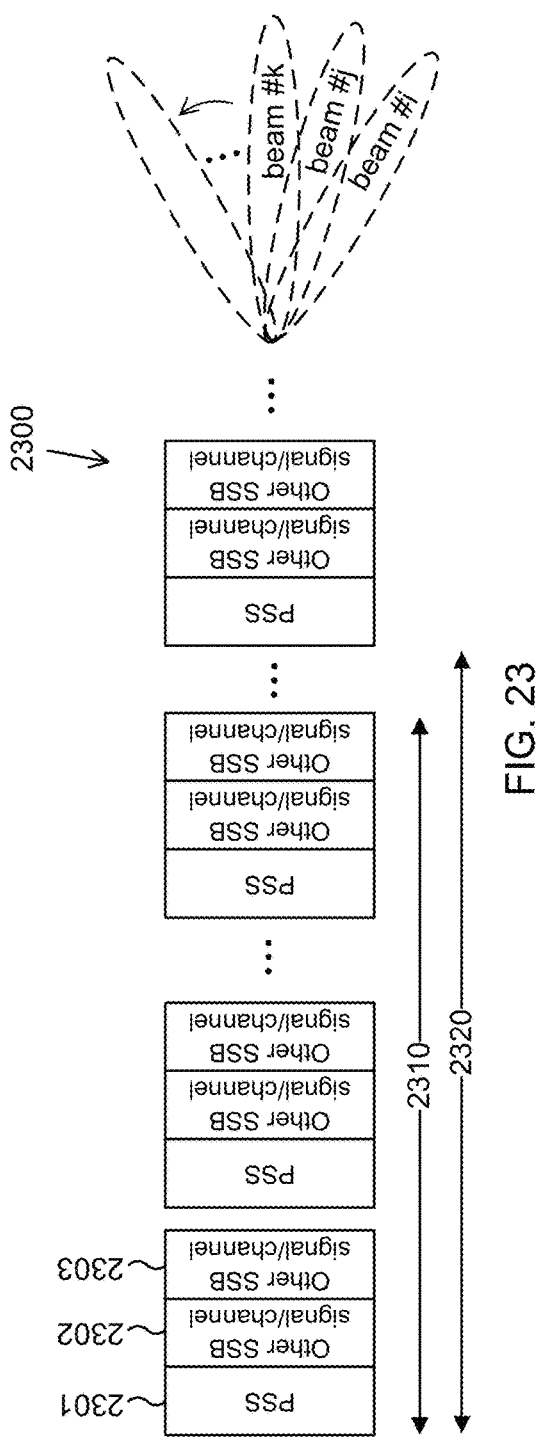
FIG. 23 illustrates an example of a burst set of the DL signal/channel for initial access according to embodiments of the present disclosure.

FIG. 23 illustrates an example of a burst set of the DL signal/channel for initial access according to embodiments of the present disclosure. The example 2300 depicted in FIG. 23 is suitable for use with the process 2200 of FIG. 22, but is for illustration only. Other embodiments could be used without departing from the scope of this disclosure.

In the example 2300 of FIG. 23, the PSS corresponding to one transmit beam is followed by SSS/PBCH transmitted in the beams associated to the PSS transmit beam. FIG. 23 illustrates an example of the transmission scheme described above in connection with FIG. 22, where one resource set 2301 is configured for beam #i for the PSS, followed by resources 2302 and 2303 for at least one transmission of other signals/channels in SSB (e.g., SSS/PBCH) in beams associated to beam #i. The beam used in adjacent to the PSS transmissions, or adjacent transmissions of other signals/channels in SSB (e.g., SSS/PBCH) may not be adjacent to one another. The set of DL signal/channel transmission corresponding to all possible beams is defined as a transmission burst 2310, while the periodicity of each PSS transmission is defined as transmission burst periodicity 2320. Predefined numbers of repetitions can be used for one or more of the first synchronization signals 2031, the second synchronization signals or system information (e.g., PBCH) 2302 and 2304.

Figure 24:
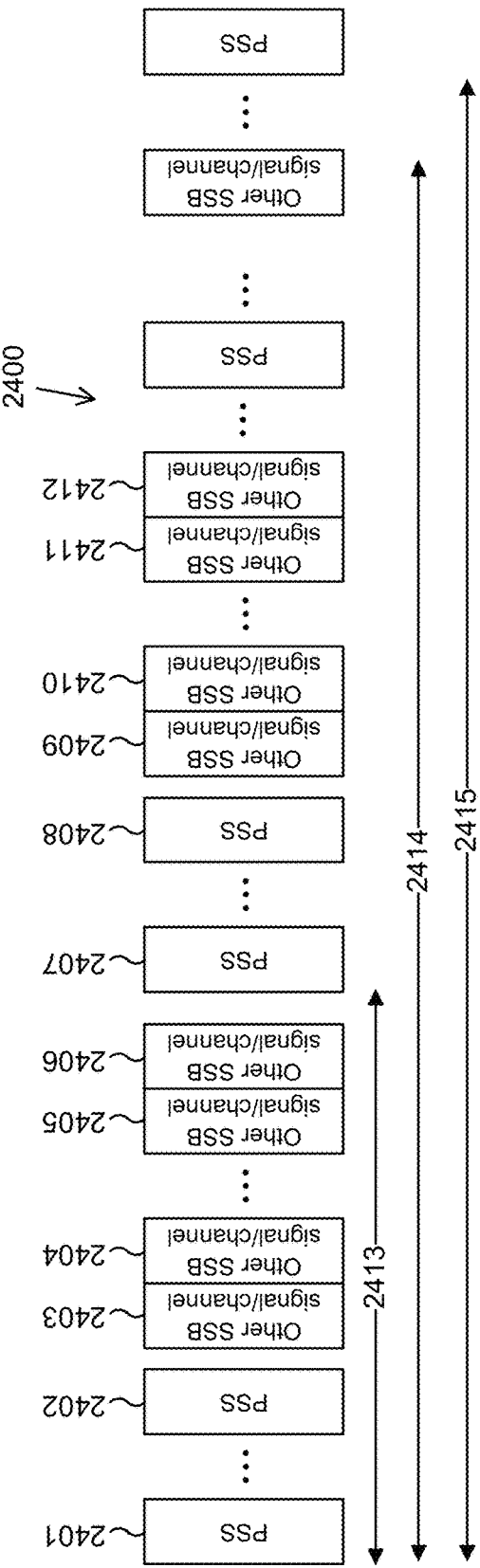
FIG. 24 illustrates an example of a burst set of DL signal/channel for initial access according to embodiments of the present disclosure.

FIG. 24 illustrates an example of a burst set of DL signal/channel for initial access according to embodiments of the present disclosure. The example 2400 depicted in FIG. 24 is suitable for use with the process 2200 of FIG. 22, but is for illustration only. Other embodiments could be used without departing from the scope of this disclosure.

At least two instances of the first synchronization signal, e.g., 2401 and 2402, can be transmitted first, using different transmission beams. One or more of the other signals/channels in the SSB (e.g., the second synchronization signal or system information such as PBCH), e.g., 2403 and 2404 associated with 2401, and 2405 and 2406 associated with 2402, can be transmitted using beams associated with the beams used for the preceding first synchronization signal and following the resources for the first synchronization signal. The set of these transmissions 2413 can be defined as a sub-burst, which can correspond to a subset of transmission beams supported by the cell for the first synchronization signal. A transmission burst 2414 includes one or more sub-bursts corresponding to a subset of transmission beams. The transmission burst 2414 includes the transmissions of DL signals/channels using all supported beams. The transmission burst can be transmitted periodically, with periodicity 2415. In the example 2400 shown, the sub-burst 2413 be one part of burst 2414; alternatively, the sub-burst 2413 can be the same as burst 2414. Predefined number of repetitions can be used for one or more of the first synchronization signals (e.g., 2401, 2402, 2407, 2408), the other signals/channels in the SSB (e.g., the second synchronization signal or system information such as PBCH) (e.g., 2403, 2404, 2405, 2406, 2409, 2410, 2411, 2412). The number of sub-bursts within one burst can be predefined, and can be different for different frequency bands. The number of PSS transmissions and the number of transmissions of the other signals/channels in SSB (e.g., the second synchronization signal or system information such as PBCH) within each sub-burst can be predefined, and can be different for different frequency bands.

In one embodiment, a gap with duration of $T_G$ can be inserted in every X symbols for the first synchronization signal, and every Y symbols for the one or more of the second synchronization signal or system information (e.g., PBCH).

As one example, $T_G$ can be the duration required for transmit beam switching, X can be equal to a predefined repetition number, and Y can be equal to the repetition number for the second synchronization signal and/or system information (e.g., PBCH), or equal to the sum of the repetition number for the second synchronization signal and/or system information (e.g., PBCH).

As another example, $T_G$ can be 0, which means all symbols are transmitted continuously. Note that there can still exist gap between the end of the first synchronization signal transmission and the start of the second synchronization signal or system information (e.g., PBCH).

In yet another example, $T_G$, X and Y can be two predefined durations to allow other DL transmissions to be sent within the gap, to avoid a long latency for other DL transmissions.

Note that in some examples, the value of $T_G$ can be different for PSS and SSS/PBCH transmissions. Also, the value of $T_G$ can be different for different frequency bands.

Figure 25:
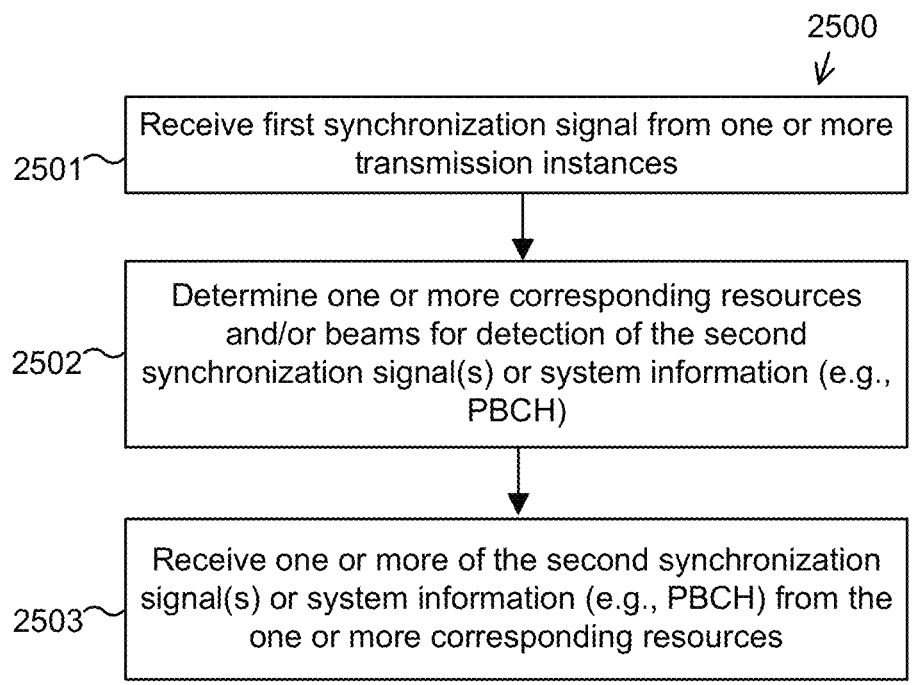
FIG. 25 illustrates a flowchart for an example of UE detection of the DL signal/channel for initial access according to embodiments of the present disclosure.

FIG. 25 illustrates a flowchart for an example of UE detection of the DL signal/channel for initial access according to embodiments of the present disclosure. The method 2500 depicted in FIG. 25 is for illustration only. Other embodiments could be used without departing from the scope of this disclosure.

At operation 2501, the UE keeps receiving the first synchronization signal from one or more transmission instances. At operation 12502, the UE determines one or more corresponding resources for the detection of one or more of the second synchronization signal or system information (e.g., PBCH), based on the detection of the first synchronization signal. In one example, the potential set of resources and beams for detection of one or more of the second synchronization signal or system information (e.g., PBCH) can be obtained based on a predefined relationship between the first synchronization signal and the second synchronization signal and/or system information (e.g., PBCH). In one example, the UE can perform receive beam sweeping and determine the reception beams for detection of the second synchronization signal and/or system information (e.g., PBCH), based on reception of the first synchronization signal. At operation 2503, the UE receives one or more of a second synchronization signal or system information (e.g., PBCH).

Techniques, apparatus and methods are disclosed that enable efficient initial beam acquisition and initial access for wireless communication systems. The disclosure relates to design of DL signal/channel for initial access (e.g., in high frequency band communication systems) that enables multi-stage beam acquisition. Specifically, the disclosed design supports transmission of first synchronization signal, and second synchronization signal and/or system information (e.g. PBCH) multiplexed in time and/or frequency manner and in different transmission beams, e.g. first synchronization signal in wide beams associated with multiple second synchronization signal and/or system information (e.g. PBCH) transmissions in narrow beams.

Although this disclosure has been described with an exemplary embodiment, various changes and modifications may be suggested to one skilled in the art. It is intended that this disclosure encompass such changes and modifications as fall within the scope of the appended claims.

What is claimed is:

1. A method, comprising:
   generating a set of synchronization signals including first and second synchronization signals;
   transmitting the first synchronization signal using a first spatial filter; and
   transmitting the second synchronization signal using a second spatial filter,
   wherein the first synchronization signal is a primary synchronization signal (PSS) and the second synchronization signal is a secondary synchronization signal (SSS),
   wherein the first spatial filter includes a larger spatial coverage than the second spatial filter, and
   wherein one or more symbols are configured between the first and second synchronization signals.

2. The method of claim 1, wherein the set of synchronization signals comprises a synchronization signal block (SSB), wherein the synchronization signal block includes a physical broadcast channel (PBCH), wherein the PSS, the SSS, and the PBCH are multiplexed in one of a time domain and a frequency domain, and wherein at least one of:
   different numbers of repetitions are applied to one or more of the PSS, the SSS, and the PBCH,
   multiple transmissions of the SSS or the PBCH, each containing different information, are associated with one PSS, and
   quasi co-location (QCL) is not assumed for the transmission of the PSS and transmissions of the SSS or the PBCH.

3. The method of claim 1, wherein an index for the second spatial filter is determined based on a predetermined relationship between a resource for transmission of the first synchronization signal and a resource for the second synchronization signal.

4. The method of claim 1, wherein one or more of:
   an index for the first spatial filter comprises a first number of bits and an index for the second spatial filter comprises a second number of bits, and
   the index for the first spatial filter and the index for the second spatial filter are jointly encoded.

5. The method of claim 1, wherein at least one signal or channel indicating an index for the first spatial filter can be one of the PSS, the SSS, a physical broadcast channel (PBCH), a demodulation reference signal (DMRS), or a synchronization or reference signal designated for indicating the index for the first spatial filter.

6. The method of claim 1, wherein the one or more symbols adjoining the synchronization signals or channels that use different transmission beams are one of:
   reserved to accommodate a beam switching time,
   punctured to accommodate the beam switching time, and
   reserved for a first region and punctured for a second region.

7. The method of claim 1, wherein the first spatial filter corresponds to one of a first plurality of beams within a sector of a coverage area and the second spatial filter corresponds to one of a second plurality of beams within the sector, and wherein the one of the first plurality of beams covers more of the sector than the one of the second plurality of beams.

8. An apparatus, comprising:
   a controller configured to generate a set of synchronization signals including first and second synchronization signals; and
   a transceiver configured to
      transmit the first synchronization signal using a first spatial filter, and
      transmit the second synchronization signal using a second spatial filter,
   wherein the first synchronization signal is a primary synchronization signal (PSS) and the second synchronization signal is a secondary synchronization signal (SSS),
   wherein the first spatial filter includes a larger spatial coverage than the second spatial filter, and
   wherein one or more symbols are configured between the first and second synchronization signals.

9. The apparatus of claim 8, wherein the set of synchronization signals comprises a synchronization signal block (SSB), wherein the synchronization signal block includes a physical broadcast channel (PBCH), wherein the PSS, the SSS, and the PBCH are multiplexed in one of a time domain and a frequency domain, and wherein at least one of:
   different numbers of repetitions are applied to one or more of the PSS, the SSS, and the PBCH,
   multiple transmissions of the SSS or the PBCH, each containing different information, are associated with one PSS, and
   quasi co-location (QCL) is not assumed for the transmission of the PSS and transmissions of the SSS or the PBCH.

10. The apparatus of claim 8, wherein an index for the second spatial filter is determined based on a predetermined relationship between a resource for transmission of the first synchronization signal and a resource for the second synchronization signal.

11. The apparatus of claim 8, wherein one or more of:
    an index for the first spatial filter comprises a first number of bits and an index for the second spatial filter comprises a second number of bits, and the index for the first spatial filter and the index for the second spatial filter are jointly encoded.

12. The apparatus of claim 8, wherein at least one signal or channel indicating an index for the first spatial filter can be one of the PSS, the SSS, a physical broadcast channel (PBCH), a demodulation reference signal (DMRS), or a synchronization or reference signal designated for indicating the index for the first spatial filter.

13. The apparatus of claim 8, wherein the one or more symbols adjoining the synchronization signals or channels that use different transmission beams are one of:
reserved to accommodate a beam switching time,
punctured to accommodate the beam switching time, and
reserved for a first region and punctured for a second region.

14. The apparatus of claim 8, wherein the first spatial filter corresponds to one of a first plurality of beams within a sector of a coverage area and the second spatial filter corresponds to one of a second plurality of beams within the sector, and wherein the one of the first plurality of beams covers more of the sector than the one of the second plurality of beams.

15. An apparatus, comprising:
a processor; and
a transceiver coupled to the processor, the transceiver configured to receive a set of synchronization signals including first and second synchronization signals, wherein the first synchronization signal is received using a first spatial filter and the second synchronization signal is received using a second spatial filter,
wherein the first synchronization signal is a primary synchronization signal (PSS) and the second synchronization signal is a secondary synchronization signal (SSS),
wherein the first spatial filter includes a larger spatial coverage than the second spatial filter, and
wherein one or more symbols are configured between the first and second synchronization signals.

16. The apparatus of claim 15, wherein the set of synchronization signals comprises a synchronization signal block (SSB), wherein the synchronization signal block includes a physical broadcast channel (PBCH), wherein the PSS, the SSS, and the PBCH are multiplexed in one of a time domain and a frequency domain, and wherein at least one of:
different numbers of repetitions are applied to one or more of the PSS, the SSS, and the PBCH,
multiple transmissions of the SSS or the PBCH, each containing different information, are associated with one PSS, and
quasi co-location (QCL) is not assumed for the transmission of the PSS and transmissions of the SSS or the PBCH.

17. The apparatus of claim 15, wherein an index for the second spatial filter is determined based on a predetermined relationship between a resource for transmission of the first synchronization signal and a resource for the second synchronization signal.

18. The apparatus of claim 15, wherein one or more of:
an index for the first spatial filter comprises a first number of bits and an index for the second spatial filter comprises a second number of bits, and
the index for the first spatial filter and the index for the second spatial filter are jointly encoded.

19. The apparatus of claim 15, wherein at least one signal or channel indicating an index for the first spatial filter can be one of the PSS, the SSS, a physical broadcast channel (PBCH), a demodulation reference signal (DMRS), or a synchronization or reference signal designated for indicating the index for the first spatial filter.

20. The apparatus of claim 15, wherein the one or more symbols adjoining the synchronization signals or channels that use different transmission beams are one of:
reserved to accommodate a beam switching time,
punctured to accommodate the beam switching time, and
reserved for a first region and punctured for a second region.

* * * * *